United States Patent
Tagawa

Patent Number: 5,481,934
Date of Patent: Jan. 9, 1996

[54] BICYCLE SPEED CHANGE OPERATION ASSEMBLY

[75] Inventor: Koichi Tagawa, Kawachinagano, Japan

[73] Assignee: Mory Suntour Inc., Osaka, Japan

[21] Appl. No.: 284,496

[22] PCT Filed: Dec. 27, 1993

[86] PCT No.: PCT/JP93/01913

§ 371 Date: Aug. 5, 1994

§ 102(e) Date: Aug. 5, 1994

[87] PCT Pub. No.: WO94/14645

PCT Pub. Date: Jul. 7, 1994

[30] Foreign Application Priority Data

Dec. 28, 1992 [JP] Japan .................. 4-349154

[51] Int. Cl.$^6$ .................................. B62M 25/04
[52] U.S. Cl. .................. 74/475; 74/142; 74/489; 74/502.2; 74/506; 474/79
[58] Field of Search .................. 74/502.2, 489, 74/475, 506, 142; 474/79, 80, 78, 81

[56] References Cited

U.S. PATENT DOCUMENTS

| | | | |
|---|---|---|---|
| 3,218,879 | 11/1965 | Reed | 74/502.2 |
| 4,191,065 | 3/1980 | Golobay et al. | 74/489 |
| 4,461,189 | 7/1984 | Rottenkolber et al. | 74/489 |
| 4,938,733 | 7/1990 | Patterson | 474/80 |
| 5,134,897 | 8/1992 | Romano | 74/489 |
| 5,203,213 | 4/1993 | Nagano | 74/475 |
| 5,390,565 | 2/1995 | Togawa et al. | 74/502.2 |
| 5,421,219 | 6/1995 | Tagawa et al. | 74/502.2 |

FOREIGN PATENT DOCUMENTS

| | | |
|---|---|---|
| 0361335 | 4/1990 | European Pat. Off. . |
| 0523257 | 1/1993 | European Pat. Off. . |
| 2657062 | 7/1991 | France . |
| 56-143191 | 10/1981 | Japan . |
| 5846693 | 3/1983 | Japan . |
| 58-191682 | 11/1983 | Japan . |
| 61-103283 | 7/1986 | Japan . |
| 4-260889 | 9/1992 | Japan . |
| 9214645 | 9/1992 | WIPO . |

*Primary Examiner*—Rodney H. Bonck
*Assistant Examiner*—Troy Grabow
*Attorney, Agent, or Firm*—Michael D. Bednarek; Marks & Murase

[57] ABSTRACT

There is disclosed a bicycle speed change operation assembly wherein the speed change operation can be performed during the braking operation, and the speed change can be made in an optimum way in relation to various running situations.

The present invention provides a bicycle speed change operation assembly comprising a first speed change operation member (14) and a second speed change operation member (103) each supported around a grip end portion of the handlebar (3) about an axis of a handlebar for rotation, a cable winding member (107) rotated in response to a rotating operation of the speed change operation members for winding or paying out a speed control cable, and a retaining mechanism (15) for holding the cable winding member at a predetermined rotational position; wherein the first speed change operation member is connected to the cable winding member for integral rotation therewith in a cable pulling direction and a cable paying out direction; whereas the second speed change operation member is connected to the cable winding member by a transmission mechanism (127) for rotating the cable winding member in the cable pulling direction or the cable paying out direction in response to rotational reciprocation of the second speed change operation member from a predetermined commencing point.

5 Claims, 20 Drawing Sheets

BICYCLE SPEED CHANGE OPERATION ASSEMBLY

FIELD OF THE INVENTION

The present invention relates to a bicycle speed change operation assembly. More specifically the present invention relates to a bicycle speed change operation assembly wherein a speed change operation can be performed during a braking operation.

BACKGROUND ART

A bicycle speed change assembly for sports type bicycles is commonly mounted on a bicycle frame member such as the down tube or the top tube. Therefore, the rider must unhand the handlebar to perform a speed change operation.

As a result, it is impossible to immediately perform a braking operation during the speed change operation. In addition, the rider has to assume a single hand steering, which leads to unstable handlebar operation and poor safety.

On the other hand the speed change operation is required, in general, when road conditions change, for example, from a flat road to a slope, or vice versa. In such occasions the bicycle becomes unstable and the brake operation is often needed.

In an attempt to solve this problem the Japanese Utility Model Laid-open 58-46693 discloses a grip rotating type speed change operation assembly, wherein a cylindrical operation member is fitted around each of the left and right grip portion of the handlebar, and these cylindrical operation members are rotated to pull or pay out the speed control cable.

In this grip rotating type speed change operation assembly, it becomes possible to perform a speed change operation without unhanding the handlebar grip portion, resulting in remarkable improvement in riding safety during speed change operation.

In off-road riding on a mountain bike for example, it is sometimes necessary to perform a speed change operation during a braking operation.

In such a case, with the conventional grip rotating type speed change operation assembly, the brake must be operated while the cylindrical operation member gripped by the hand and fingers must be rotated at the same time. However, when the speed change operation is required through a plurality of speed steps, the amount of rotation required for the speed change operation member becomes large, and therefore, the hand and finger must be repositioned. Thus, it is very difficult to perform a speed change operation in optimum response to different riding situations while keeping the fingers engaged with the brake lever.

In addition the speed change operation is performed in various ways in response to the changing running situation; sometimes the speed change operation is made in a stepped manner, or some other times the speed change operation is made all the way through several speed steps as mentioned earlier. It is too demanding to perform the speed change operation in many different ways using only one operation member.

DISCLOSURE OF THE INVENTION

It is therefore an object of the present invention to provide a bicycle speed change operation assembly wherein the speed change operation can be performed during the braking operation, and the speed change can be made in an optimum way in relation to various running situations.

The present invention provides a bicycle speed change operation assembly comprising a first speed change operation member and a second speed change operation member each supported around a grip end portion of the handlebar about an axis of a handlebar for rotation, a cable winding member rotated in response to a rotating operation of the speed change operation members for winding or paying out a speed control cable, and a retaining mechanism for holding the cable winding member at a predetermined rotational position; wherein the first speed change operation member is connected to the cable winding member for integral rotation therewith in a cable pulling direction and a cable paying out direction; whereas the second speed change operation member is connected to the cable winding member by a transmission mechanism for rotating the cable winding member in the cable pulling direction or the cable paying out direction in response to rotational reciprocation of the second speed change operation member from a predetermined commencing point.

Other objects, characteristics and advantages of the present invention will become clear from the preferred embodiments to be described later with reference to attached figures.

BEST MODE FOR CARRYING OUT THE INVENTION

FIGS. 1 through 12 show a first embodiment of the present invention.

Figure 1:
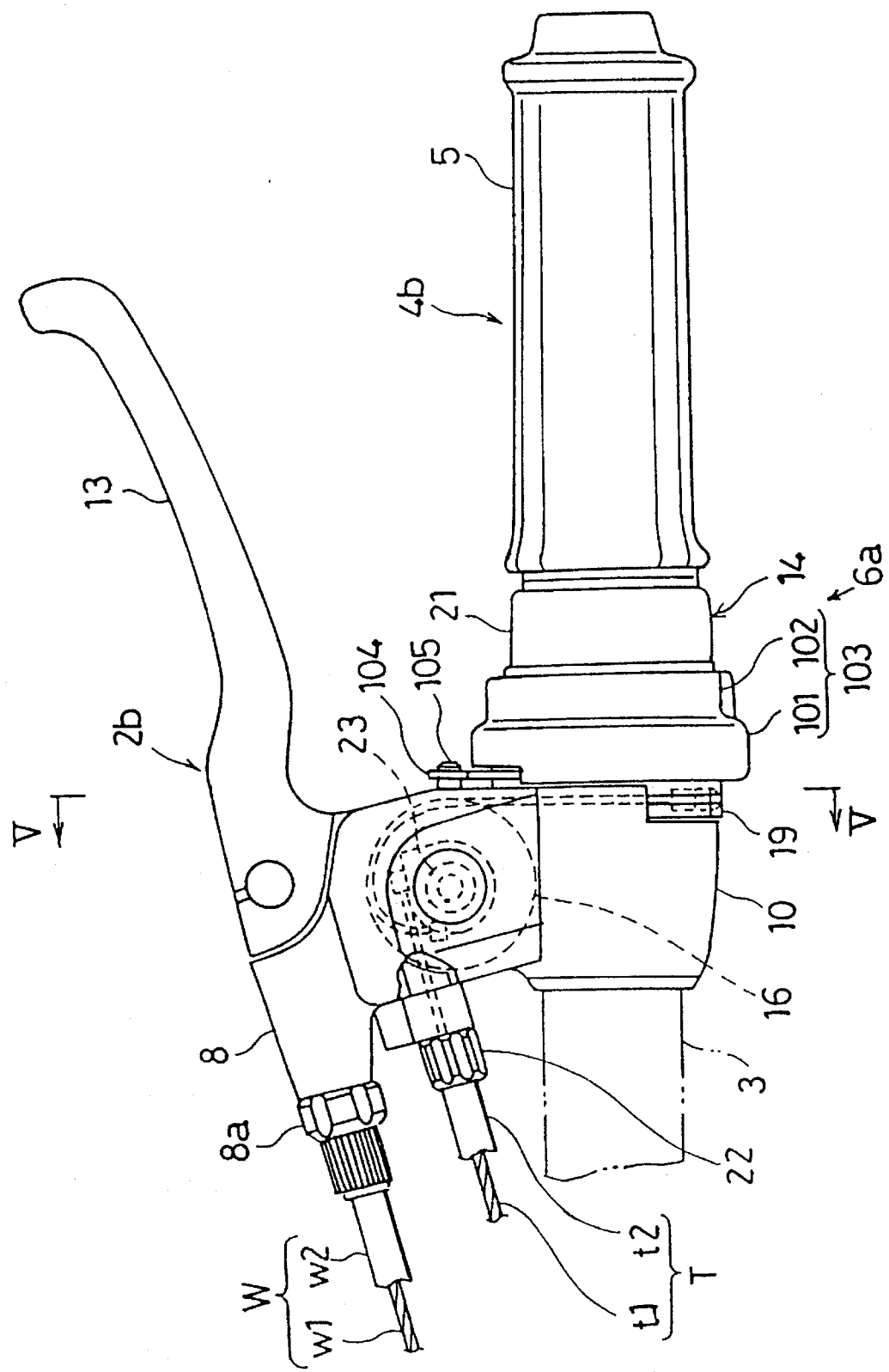
FIG. 1 is a plan view of a first embodiment of the speed change operation assembly according to the present invention.

As will be understood from FIG. 1, this embodiment is an application of the present invention to a speed change operation assembly 6a provided on the right side of a handlebar 3. The present invention is also applicable to a speed change operation assembly to be provided on the left side of the handlebar 3.

Referring now to FIG. 1, the speed change operation assembly 6a is provided in an area from a brake lever assembly 2b to a right hand grip portion 4b formed at the right end portion of the handlebar 3.

Figure 2:
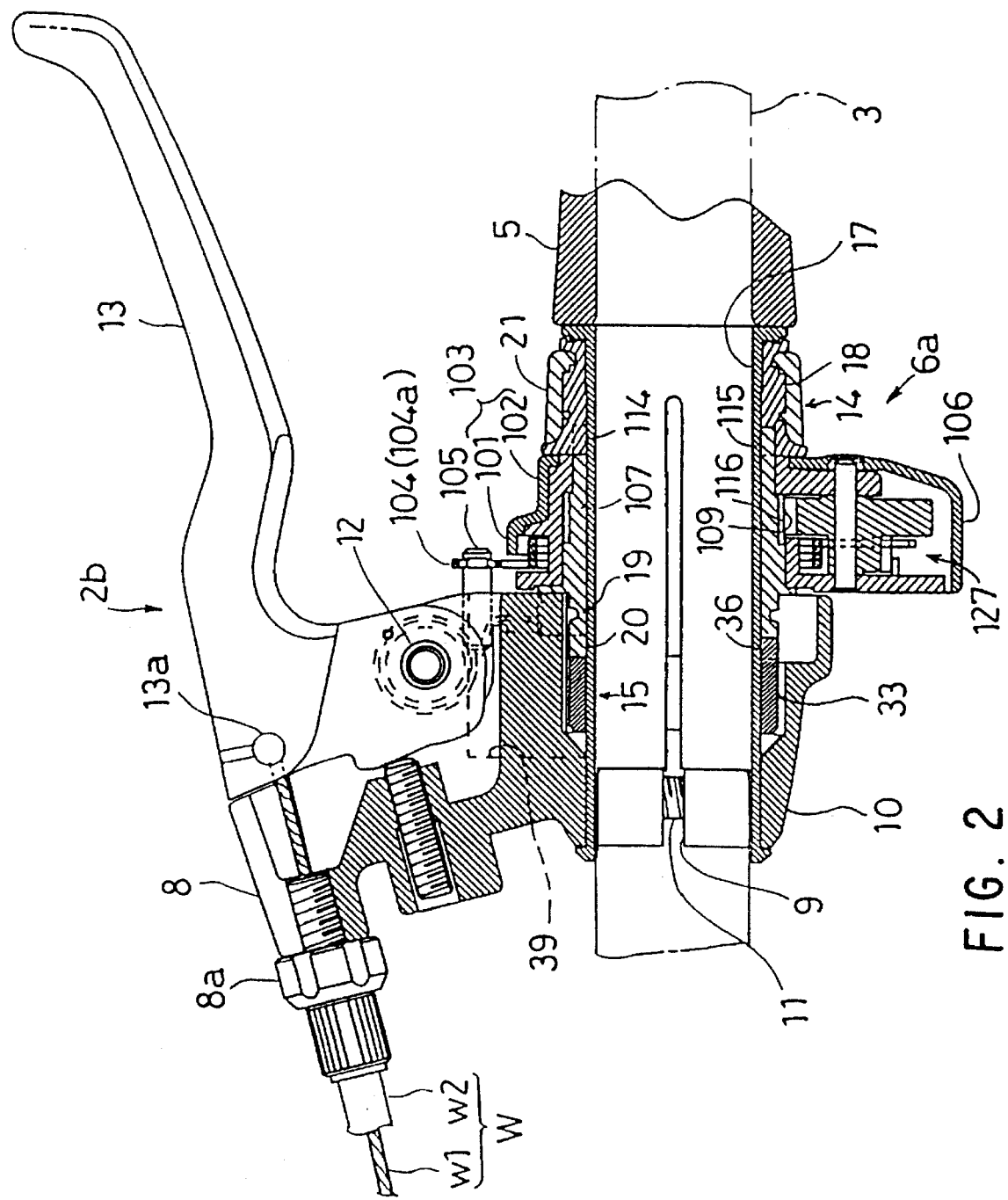
FIG. 2 is a sectional view of the first embodiment taken along the Line III-O-$A_1$-$A_2$-III of FIG. 4.

As shown in FIGS. 1 and 2 the brake lever assembly 2b includes a brake bracket 8 and a brake lever 13. The brake bracket 8 is supported around the handlebar 3, projecting forwardly of the bicycle. The brake lever 13 is pivotally supported at its base end portion around a lever shaft 12 provided in the brake bracket 8. The brake lever operational arm portion is extended ahead of the grip portion 4b.

A brake cable W includes an inner wire w1 and an outer sheath w2. An end of the outer sheath w2 is fixed to a sheath catcher bolt 8a screwed to a laterally inward end of the brake bracket 8. The inner wire w1 extends out of the end of the outer sheath w2 into the brake bracket 8, and a nipple 13a provided at the end is fixed to the brake lever 13.

As shown in FIGS. 1 and 2 the brake bracket 8 is provided with a cylindrical mount 10 having a slit 9. The area of the handlebar 3 where the brake lever assembly 2b and the speed change operation assembly 6a is mounted is covered by a cylindrical sleeve member 17 made of resin for rotatably supporting a first speed change operation member 14, a cable winding member 107 and other members to be described later. The cylindrical mount 10 is fitted around the resin sleeve member 17, and is fastened together with the sleeve member 17 to the handlebar 3 by a screw 11 traversing the slit 9.

Figure 3:
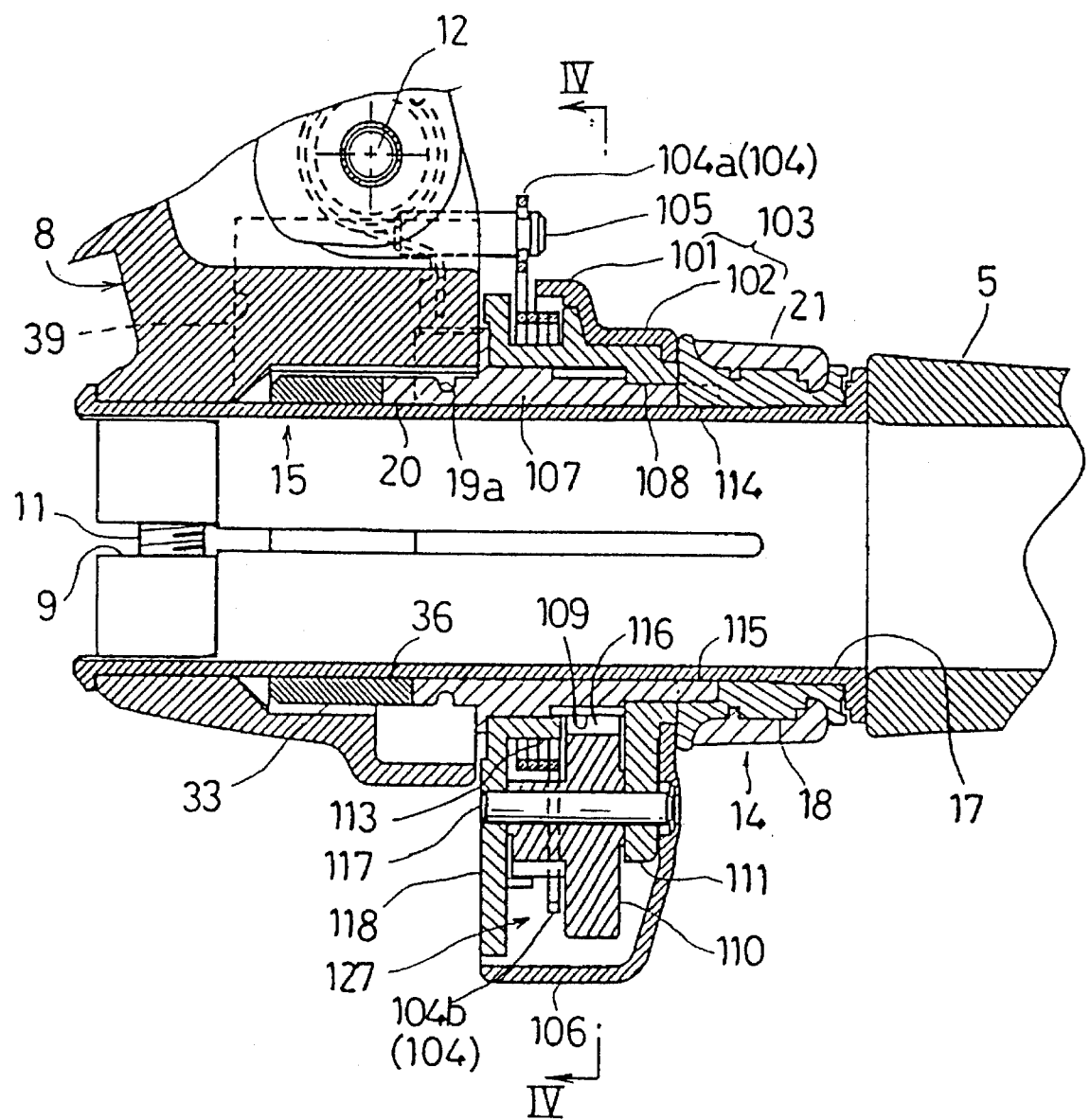
FIG. 3 is an enlarged view of a primary portion in FIG. 2.

As shown in FIGS. 2 and 3 the speed change operation member 6a according to the present embodiment is formed integrally with the brake lever assembly 2b from the brake bracket 8 to the grip portion 4b.

The speed change operation member 6a comprises a first speed change operation member 14 which is cylindrical, a second speed change operation member 103 which is shaped in a stepped cylinder, a retaining mechanism 15, a cable winding member 107 and a cable winding reel 16.

The first speed change operation member 14 includes a grip operation portion 18 rotatably supported around the sleeve member 17, a rubber cover 21 fitted around the grip operation member 18, and a connecting portion 114 formed at the inward end for engagement with the cable winding member 107. The cover 21 is formed continuously with the handle grip 5.

The second speed change operation member 103 includes a grip operation portion 102 formed continuously with the first speed change operation member 14, an inward wall portion 101 stepped outward radially at a laterally inward side of the grip operation portion 102, and a press operation portion 106 bulging outward radially and downwardly from the grip operating portion 102 or inward wall portion 101. The second speed change operation member 103 is rotatably supported inward axially of the first speed change operation member 14 around the cable winding member 107 via a transmission mechanism 127.

The cable winding member 107 is supported around the sleeve member 17 in the same manner as the first speed change operation member 14. This cable winding member generally includes a connecting portion 115 for engagement with the connecting portion 114 of the first speed change operation member 14, an engaging teeth portion 109 which constitutes the transmission mechanism 127, a drive reel portion 19 integrally formed inward laterally of the engaging teeth 109 for winding or paying out a drive cable K to the cable winding reel 16, and a connecting portion 20 for activating the retaining mechanism 15.

When the first or second speed change operation member 14 or 103 is rotated, the cable winding member 107 rotates therewith to wind or pay out the control cable.

The retaining mechanism 15 is provided inward axially of the second speed change operation member 103 within the inner space of the cylindrical mount 10. In the present embodiment a click mechanism 32 is used for the retaining mechanism 15 so that the cable winding member 107 and the first speed change operation member 14 is held stepwise.

Figure 6:
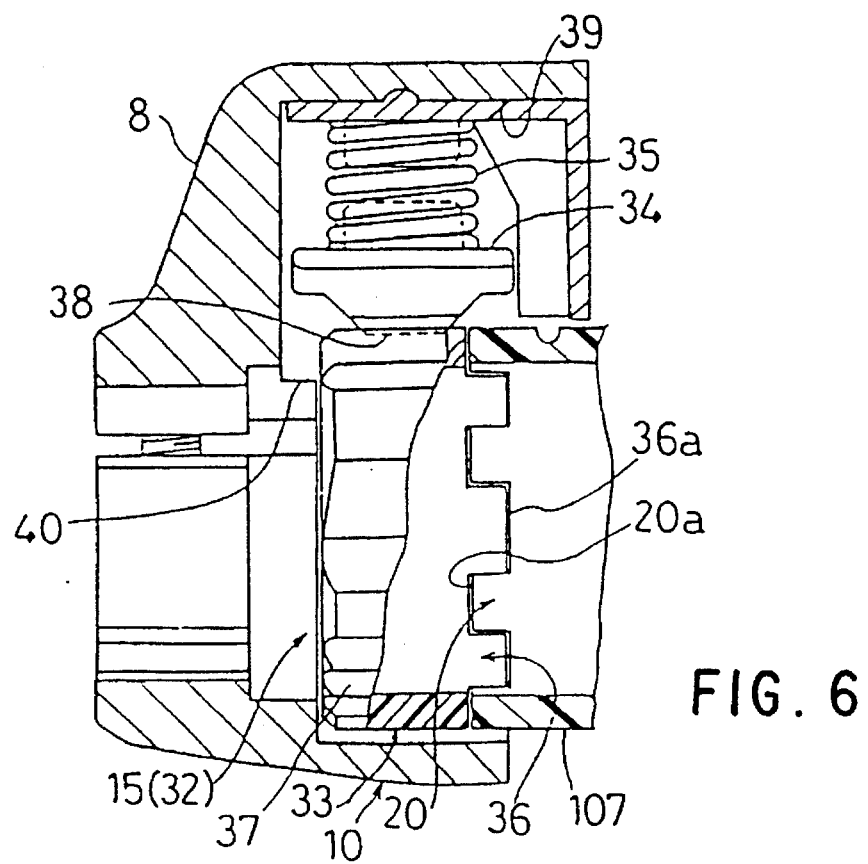
FIG. 6 is a sectional view taken along the line VI—VI in FIG. 5.

As shown in FIG. 6 the click mechanism 32 generally includes a click ring 33, an engaging member 34 and a coil spring 35.

The click ring 33, formed generally cylindrically, is rotatably supported around the sleeve member 17 within the inner space of the cylindrical mount 10. The click ring 33 is formed at its axially outward end with a connecting portion 36 for engagement with the connecting portion 20 of the cable winding member 107. The connecting portion 36 is formed with a plurality of connecting teeth 36a, which engages with a plurality of connecting teeth 20a formed at the connecting portion 20 for rotating the cable winding member 107 and the first speed change operation member 14 integrally with the click ring 33. The click ring 33 is formed with a plurality of axially parallel engaging recesses 37 around its outer circumference.

The engaging member 34 is housed with the coil spring 35 in a housing hole 39 provided at the base end portion of the brake bracket 8. The housing hole 39 is formed with an opening 40 communicating with the inner circumference of the cylindrical mount 10 of the brake bracket 8. A pawl portion 38 of the engaging member 34 projects through this opening 40 for contacting the outer circumference of the click ring 33.

The coil spring 315 elastically urges the engaging member 34 toward the outer circumference of the click ring 33. Thus, successive and elastic engagement of the pawl portion 38 of the engaging member 34 with the engaging recesses 37 holds the cable winding member 107 stepwise at predetermined rotational positions via the click ring 33.

Figure 7:
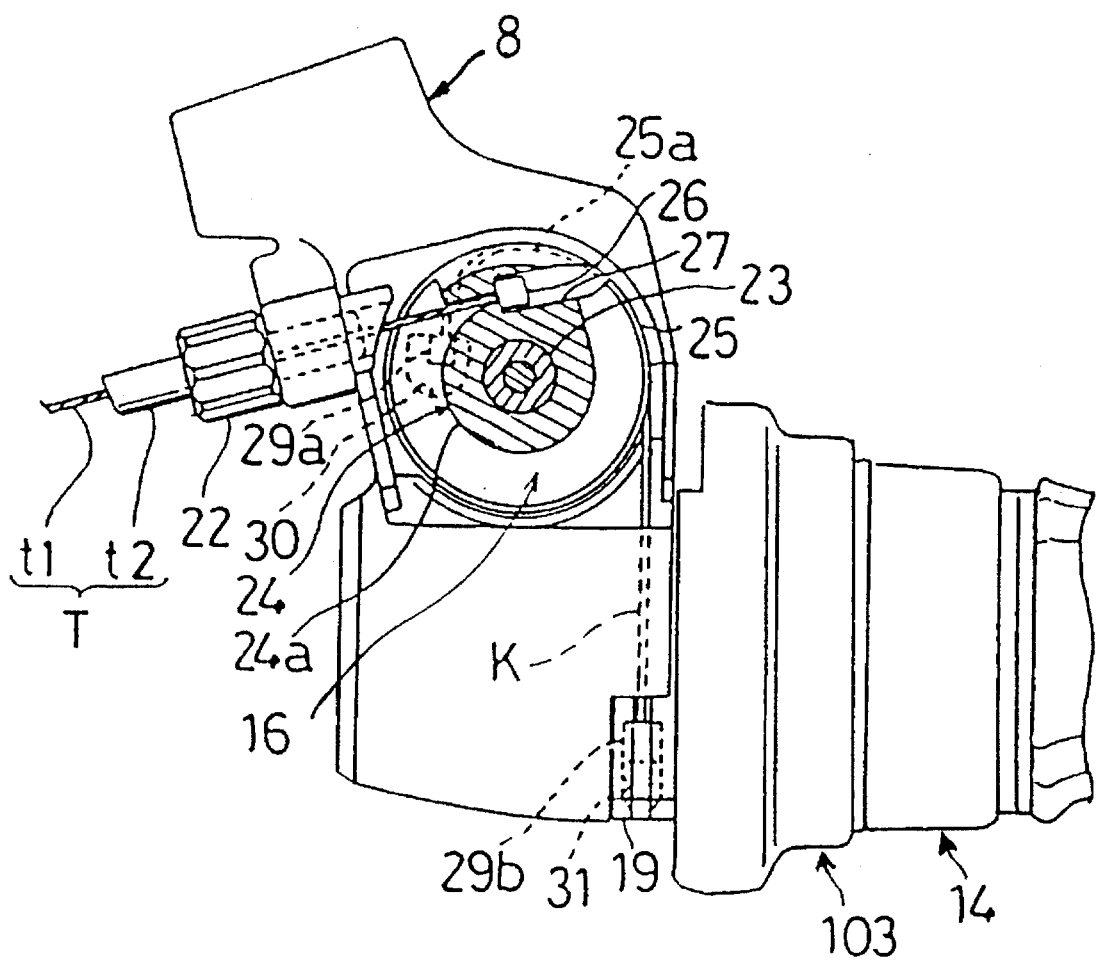
FIG. 7 is a sectional view taken along the line VII—VII in FIG. 5.

FIG. 7 is a sectional view of a primary portion of the cable winding reel 16 of the speed change operation assembly 6a according to the present embodiment.

Figure 5:
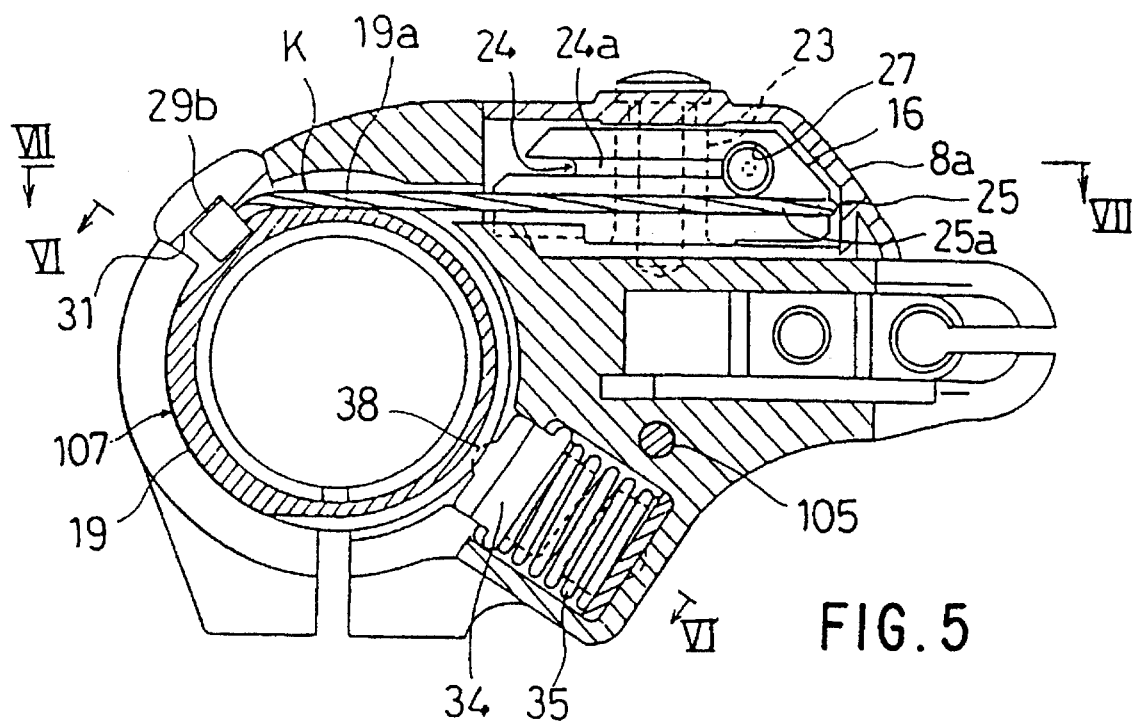
FIG. 5 is a sectional view taken along the line V—V in FIG. 1.

As shown in FIGS. 5 and 7 the cable winding reel 16, shaped in a generally circular frustum, is rotatably supported around a shaft 23 provided in the top face of the brake bracket 8. A member given the alpha-numeric code 8a is a cover enclosing the cable winding reel 16.

A speed control cable T includes an inner wire t1 and a surrounding outer sheath t2. As shown in FIG. 1 the speed control cable T is laid along the handlebar 3. An end of the outer sheath t2 is fixed to a sheath catcher 22 bolted at the inward side of the base end of brake bracket 8. The inner wipe t1 extending out of the end of outer sheath t2 is wound around the cable winding reel 16 provided on the top face of the brake bracket 8.

The cable winding reel 16 is formed around its outer circumference with a first reel portion 24 for winding the inner wire t1, and a second reel portion 25 for winding a drive cable K extending from the drive reel portion 19 of the cable winding member 107.

The first reel portion 24 is formed at a diametrically smaller side of the cable winding reel 16, including a cable winding groove 24a formed by cutting the slope of the frustum inward radially, and a nipple catcher hole 27 formed tangentially continuously. The inner wire t1 is wound around the cable winding groove 24a, and an end nipple 26 is fixed to the nipple catcher hole 27.

The second reel portion 25 is formed at a diametrically larger side of the cable winding reel 16, and a cable winding groove 25a is formed substantially along the outermost diameter of the cable winding reel 16. The end portion of the cable winding groove 25a is curved inward radially, and the end is formed with a nipple catcher hole 30.

The drive cable K, wound around the cable winding groove 25a of the second reel portion 25, is formed at its end with a nipple 29a for fixing to a nipple catcher hole 30. Thus, the drive cable K is connected at its one end to the cable winding reel 16.

The drive reel K is extended from the drive reel portion 19 vertically in relation to the handlebar 3. The other end of the drive cable K is provided with a nipple 29b, which is housed in a nipple catcher hole 31 provided along a cable winding groove 19a of the drive reel portion 19. Thus, the other end of the drive cable K is fixed to the cable winding member 107.

The speed control cable T and the drive cable K are wound or paid out substantially vertically to each other. Thus, when the drive cable K is wound circumferentially around the cable winding member 107, the speed control cable t1 is pulled along the handlebar 3.

As shown in FIG. 2 the first speed change operation member 14 and the cable winding member 107 are rotated integrally with each other since their respective connecting portions 114, 115 engage with each other. When the first speed change operation member is rotated to move its top surface forwardly, the drive cable K is pulled and wound around the drive reel portion 19, rotating the cable winding reel 16 clockwise as viewed in FIG. 1 to pull the inner wire t1.

On the other hand when the first speed change operation member 14 is rotated to move its top surface rearwardly, the drive cable K is paid out from the drive reel portion 19, allowing an unillustrated return spring provided in the speed shifter to rotate the cable winding reel 16 counterclockwise as viewed in FIG. 1 to pay out the inner wire t1 from the first reel portion This pulling or paying out operation of the inner wire t1 generates relative axial movement between the inner wire t1 and the outer sheath t2 for operating the unillustrated speed shifter.

The transmission mechanism 127 is provided so that the cable winding member 107 can be rotated in the cable pulling direction by rotational reciprocation of the second operation member 103 from a predetermined commencing point of rotation.

Figure 4:
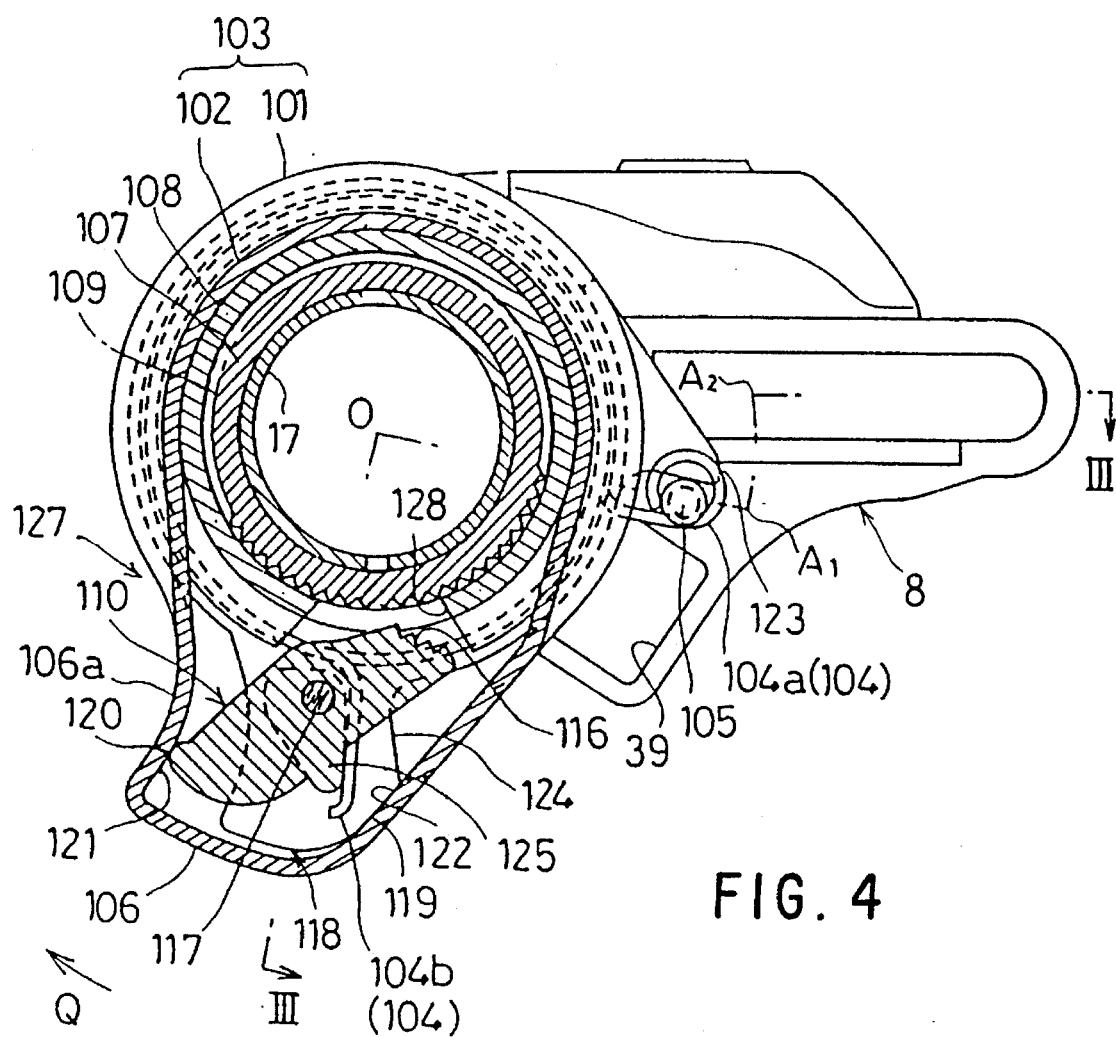
FIG. 4 is a sectional view taken along the line IV—IV in FIG. 3.

As shown in FIGS. 3 and 4 the transmission mechanism 127 includes a pawl holding member 108, an engaging pawl 110, and a return spring 104.

The pawl holding member 108 is rotatably fitted around the cable winding member 107 inward radially of the second speed change operation member 103. As shown in FIG. 4 the pawl holding member 108 is integrally formed with an extended portion 118 extending into the hollow inside of the press operation portion 106. The pawl holing member 108 is relatively rotatable to the second speed change operation member 103 while the extended portion 118 is given a circumferential width smaller than the circumferential width of the inner space of the press operation portion 106. Thus, the pawl holding member 108 is relatively pivotable to the second speed change operation member 103 within the range that the extended portion 118 can perform play rotation in the inner space of the press operation portion 106.

The pawl holding member 108 is formed with a pin holding wall 111 substantially parallel to the extended portion 118. The pin holding wall faces the extended portion 118 axially outwardly. A pin 117, bridging between the extended portion 118 and the pin supporting wall 111, pivotally supports the engaging pawl 110.

An opening 128 is provided between the extended portion 118 and the pin supporting wall 111 for allowing a pawl portion 116 of the engaging pawl 110 to engage with the teeth portion 109 of the cable winding member 107.

Figure 10:
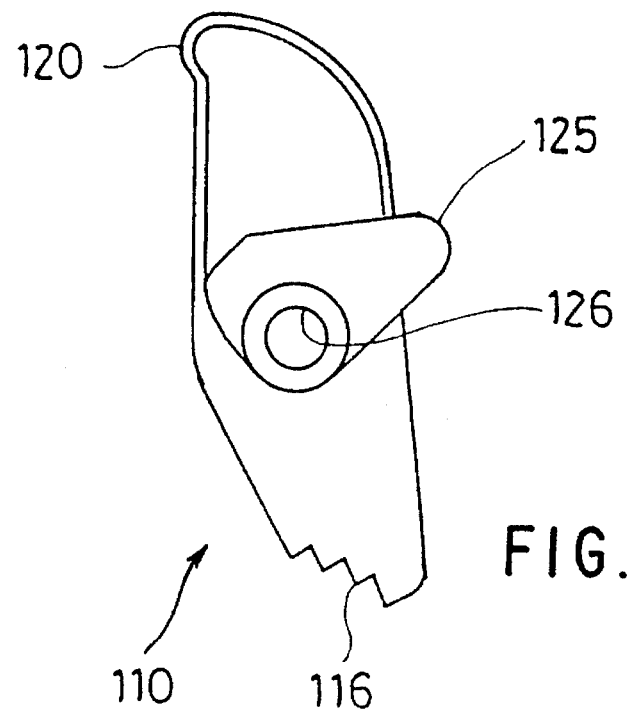
FIG. 10 is a left side view of an engaging pawl according to the first embodiment.
Figure 11:
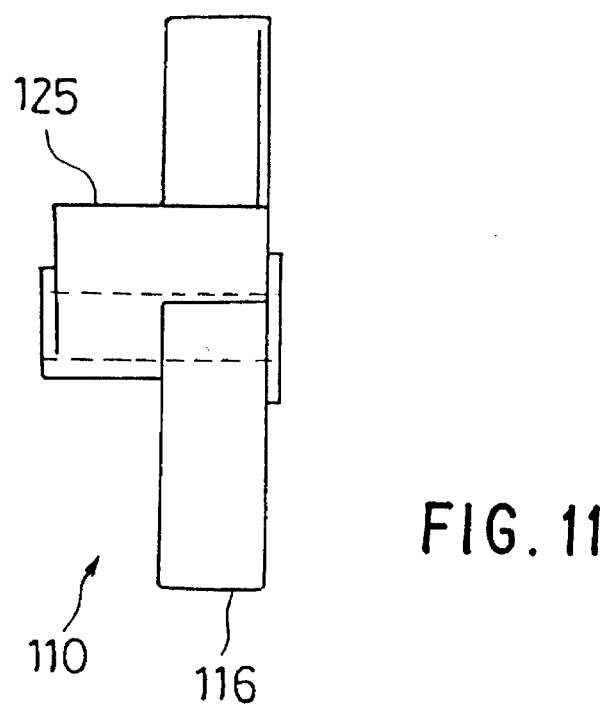
FIG. 11 is a front view of the engaging pawl according to the first embodiment.
Figure 12:
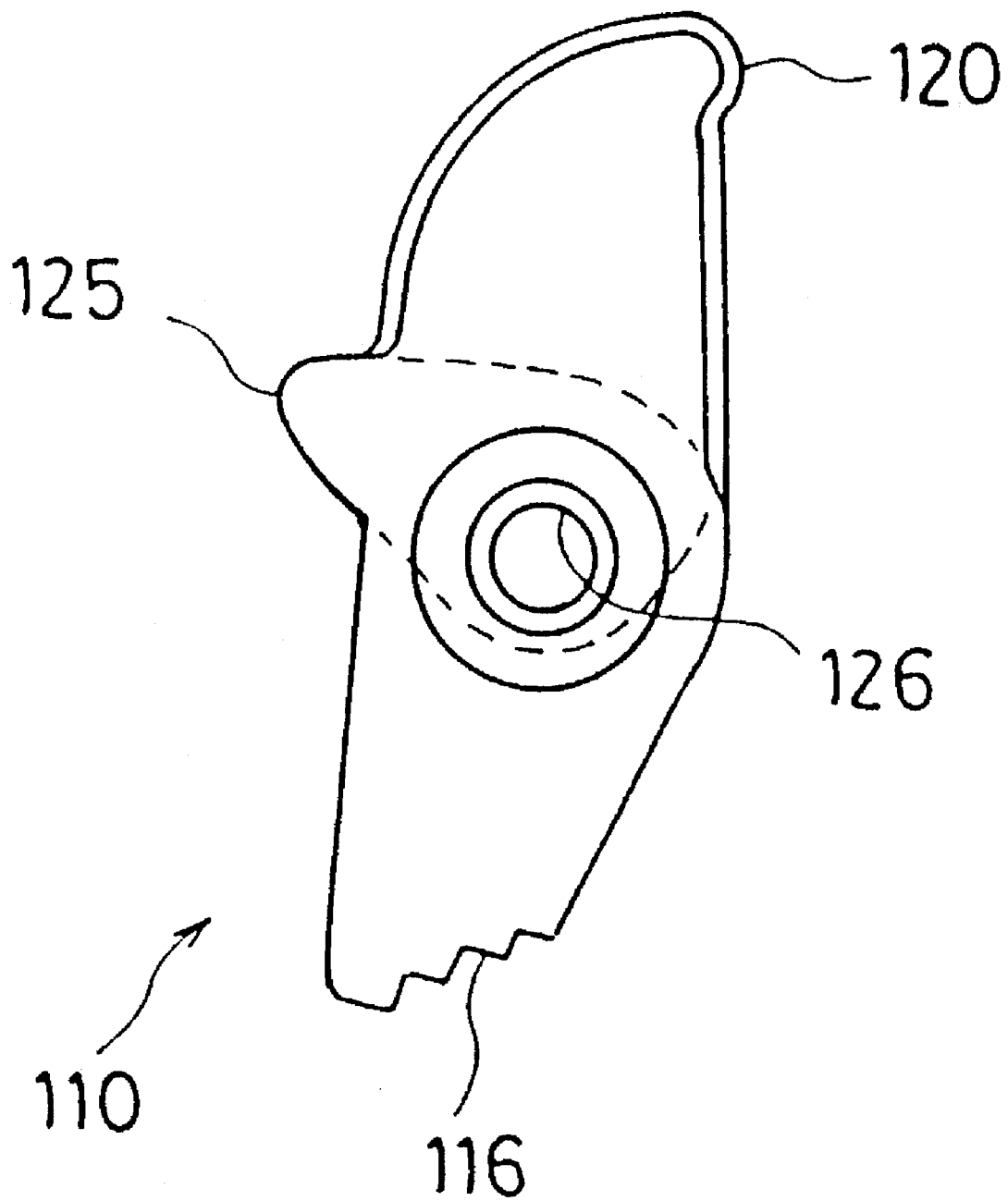
FIG. 12 is a right side view of the engaging pawl according to the first embodiment.
Figure 13:
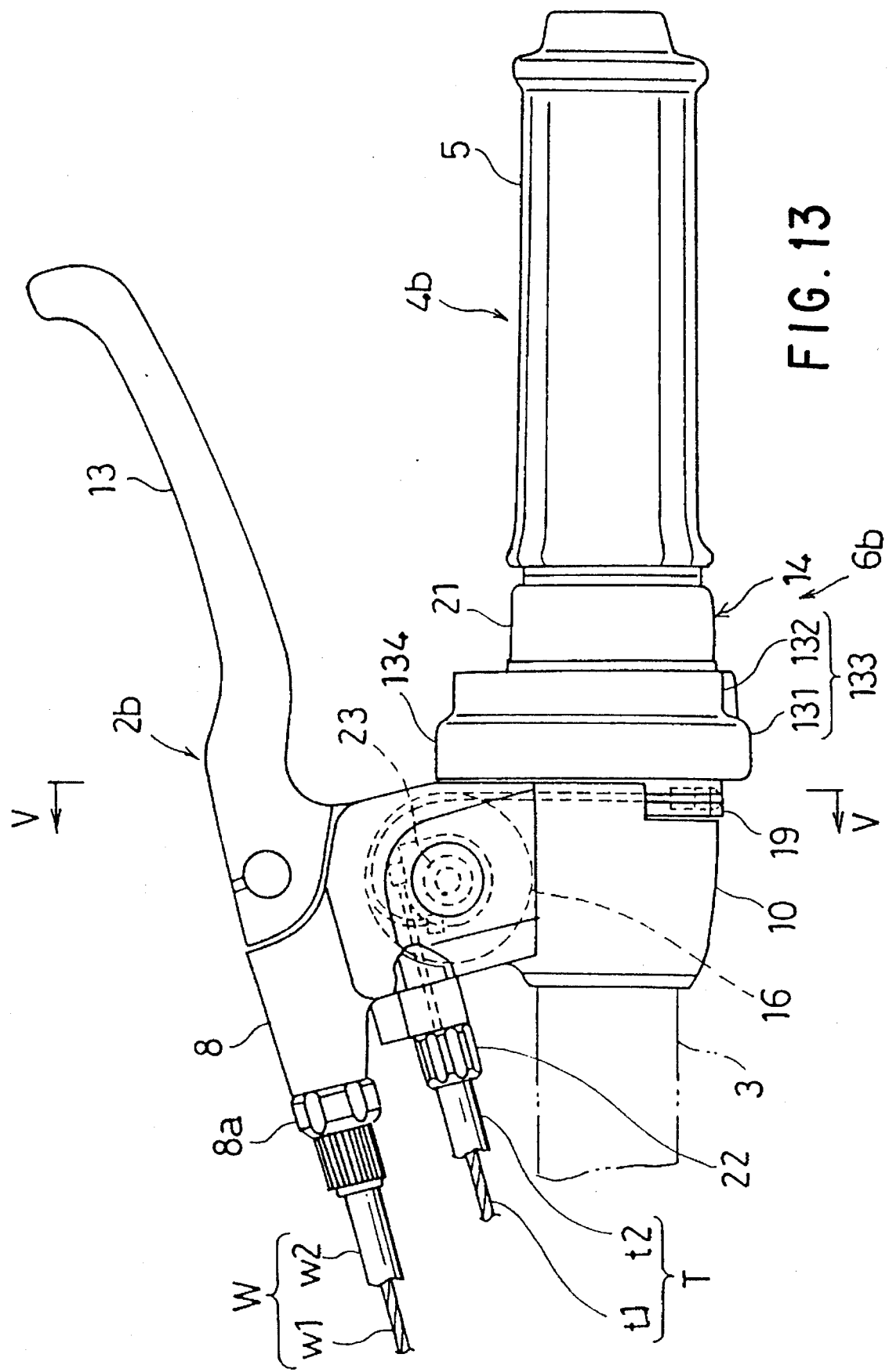
FIG. 13 is a plan view of a second embodiment of the speed change operation assembly according to the present invention.
Figure 14:
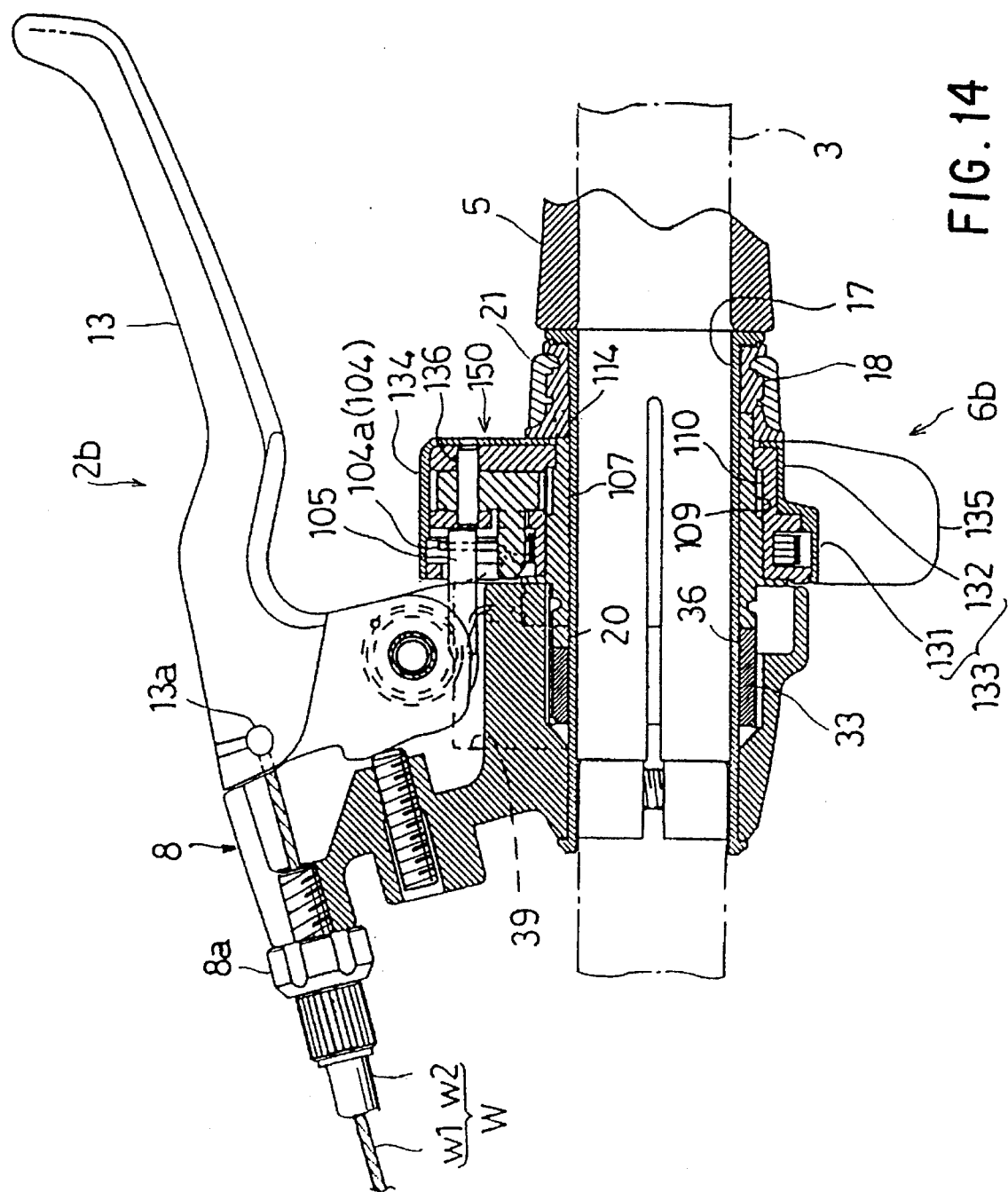
FIG. 14 is a sectional view of the second embodiment taken along the Line XV-O-$A_1$-$A_2$-XV of FIG. 16.

As shown in FIGS. 10 through 12 the engaging pawl 110 is provided at its end portion with the engaging pawl portion 116 for engagement with the engaging teeth portion 109 of the cable winding member 107. A pressing portion 120 is provided at the other end, opposing the engaging pawl portion 116 with the pivotal center in between. The engaging pawl is further provided with a spring catcher 125 for holding an end of the return spring The return spring 104 is placed between the extended portion 118 and the engaging pawl 110, and its coiled portion fits around the pawl holding member 108. An end 104a of the return spring is fixed to a spring catcher pin 105, while the other end 104b is fixed to the spring catcher 125 of the engaging pawl 110. Thus, the return spring 104 elastically urges the second speed change operation member 103 clockwise as viewed in FIG. 4 (Arrow Q) via the engaging pawl 110 or the pawl holding member 108.

The pawl holding member 108 is provided with a stopper portion 123 extending outward radially for holding the second speed change operation member 103 at a predetermined rotational position. At free state this stopper portion 123 contacts the spring catcher pin 105, thereby holding the second speed change operation member 103 at a predetermined commencing point of rotation which is the clockwise end of the rotation.

Since the end 104b of the return spring 104 is fixed to the spring catcher 125, the engaging pawl 110 is pivotally moved clockwise as viewed in FIG. 4, causing the pawl portion 116 of the engaging pawl 110 to disengage from the engaging teeth portion 109 of the cable winding member 107. At free state the pressing portion 120 of the engaging pawl 110 contacts a clockwise inner face 121 of the press operation portion 106 while a counterclockwise end face 119 of the extended portion 118 contacts a counter clockwise inner face 120 of the press operation portion.

Description will next be made on function of the transmission mechanism 127 arranged as described hereinabove.

Figure 8:
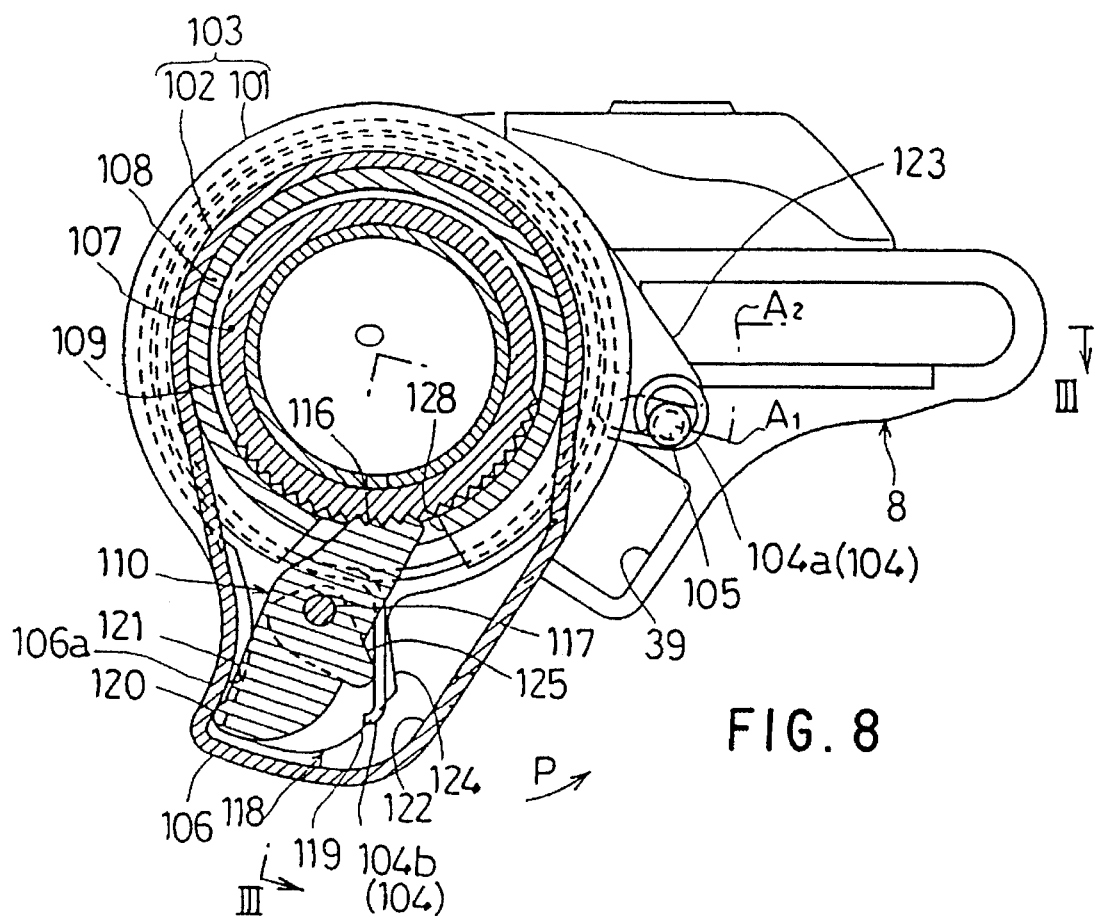
FIG. 8 is a sectional view corresponding to FIG. 4 for depicting function of the first embodiment.

Starting from the state shown in FIG. 4, when the rider presses, by using the thumb for example, a clockwise outer face 106a of the press operation portion 106 in the counterclockwise direction, the pressing portion 120 of the engaging pawl 110 is pressed onto the clockwise inner face 121 of the press operation portion 106. Then, the engaging pawl 110 is pivoted counterclockwise relative to the extended portion 118 of the pawl holding member 108, bringing the pawl portion 116 into engagement with the teeth portion 109 of the cable winding member 107 as shown in FIG. 8. When the press operation portion 106 is further pivoted from the state shown in FIG. 8 to the state in FIG. 9, the cable winding member 107 is rotated in the cable pulling direction.

The rotation of the second speed change operation member 103 is stopped when a clockwise front face 124 of the extended portion 118 contacts the spring catcher pin 105. Thus, the second speed change operation member 103 is rotated within the range limited by the stopper portion 123 and the front face 124 of the extended portion.

Figure 9:
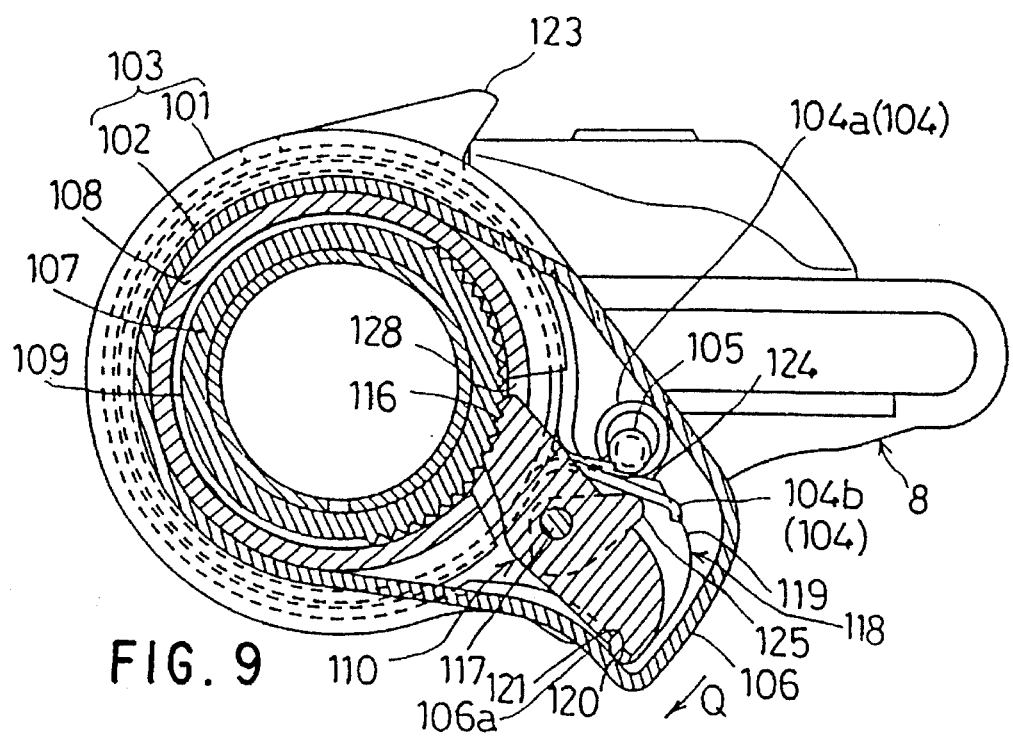
FIG. 9 is a sectional view corresponding to FIG. 4 for depicting function of the first embodiment.

Now, when the pressing force applied in the state shown in FIG. 9 is removed, the end portion 104b of the return spring 104 causes the engaging pawl 110 to move clockwise. The press operating portion 120 of the engaging pawl 110 presses the clockwise inner face 121 of the press operation portion 106, moving the second speed change operation member 103 clockwise. It should be noted that the clockwise movement of the engaging pawl 110 disengages the pawl portion 116 from the engaging teeth portion 109.

Therefore, by rotatively reciprocating the second speed change operation member 103 within the above predetermined moving range, the rider can rotate the cable winding member 107 in the cable pulling direction to perform a speed change.

In the speed change operation assembly of the above described arrangement, a speed change operation can be performed according to the amount of rotational operation of the first speed change operation member 14. Since the first speed change operation member also functions as part of the handle grip to be grabbed by the rider, it is possible to perform the speed change operation without unhanding the grip portion of the handlebar. Thus, it becomes possible to quickly perform a braking operation, resulting in a significant improvement in safety and speed change operability.

Further, in the speed change operation assembly 6a according to the present embodiment, the cable winding member 107 can also be rotated in the cable pulling direction by rotatively reciprocating the second speed change operation member 103 from the commencing point of rotation. By using this second speed change operation member 103 it is possible to pull a necessary amount of control cable for a speed change operation while the reciprocating movement per stroke can be smaller than in the rotational movement of the first speed change operation member 14.

Therefore, when a greater amount of cable must be pulled for a speed change, it is still possible without changing the grip position on the second speed change operation member 103 to perform the speed change operation through a plurality of speed steps. This leads to a significant improvement in speed change operability and assured operability in a quick braking operation, resulting in substantially improved safety.

Further, in the present embodiment the press operation portion 106 is provided below the second speed change operation member 103. This allows the rider to use his thumb, for example, to press the press operation portion 106 for pulling the speed control cable. Hence, it becomes possible to keep the forefinger and the other fingers engaged with the brake lever 13 while preforming a speed change with the thumb by pressing the pressing portion 106.

It is now possible to perform a speed change operation at the same time with a braking operation, making possible to perform a speed change operation in different ways in response to various running conditions.

It should be noted that in this embodiment the engaging pawl 110 is held apart from the engaging teeth portion 109 at free state. This prevents the second speed change operation member 103 from rotating with the first speed change operation member when the first speed change operation member 14 is rotated. The provision of the second speed change operation member, therefore, does not deteriorate the operability of the first speed change operation member 14.

Further, in this embodiment, the second speed change operation member 103 is formed in a cylindrical shape having the press operation portion 106. As a result, a speed change operation can be performed regardless of the grip position around the second speed change operation member. This means that the rider can also grip the second speed change operation member 103 using his entire hand and fingers to perform a speed change operation, resulting in further improvement in the speed change operability.

FIGS. 13 through 22 show a second embodiment of the present invention.

In this embodiment the brake lever assembly 2b, the first speed change operation member 14, the retaining mechanism 15 and the speed control cable winding mechanism provided on top of the brake bracket 8 use the same constitution as in the first embodiment, and therefore, will not be described hereinbelow.

Figure 16:
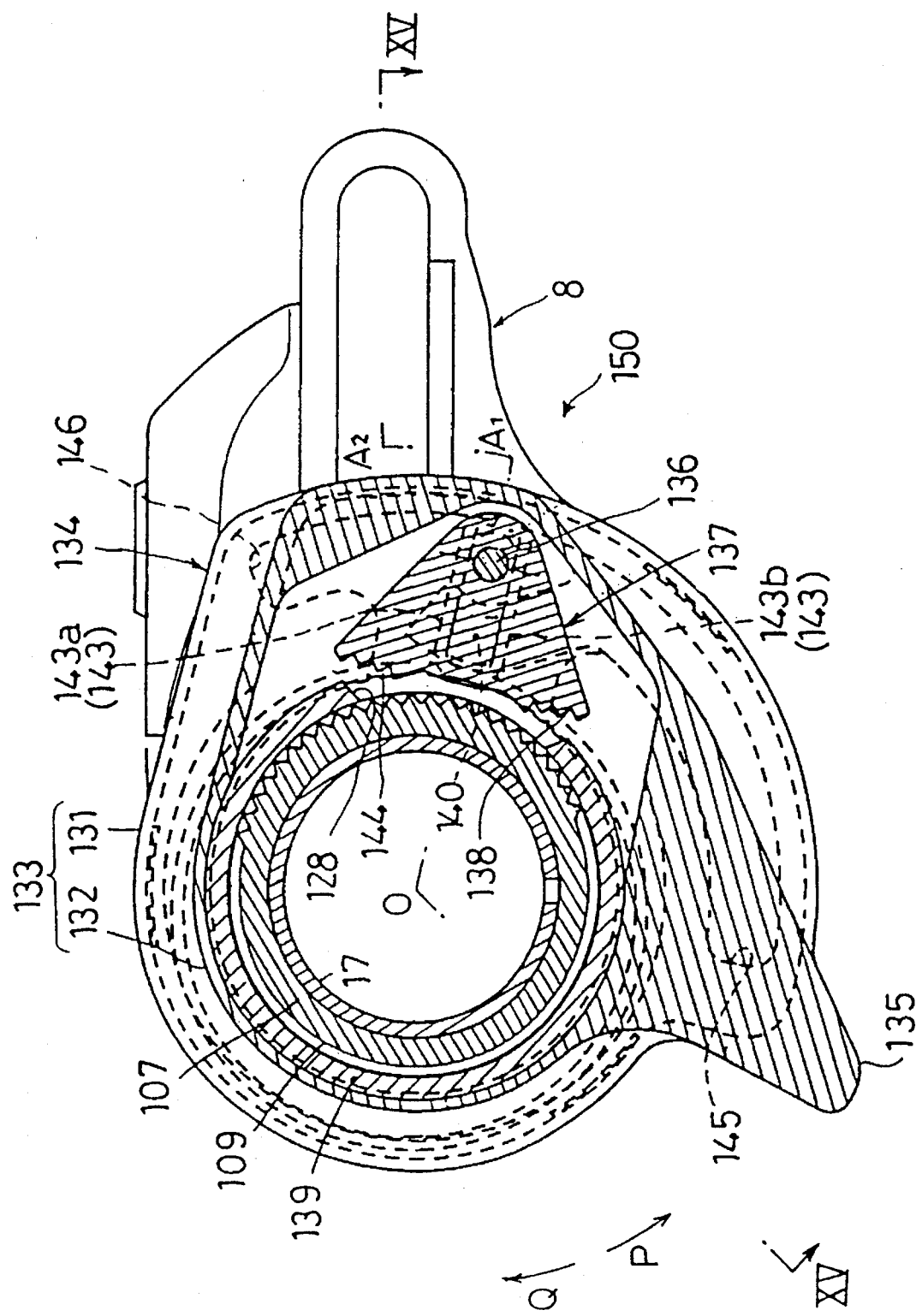
FIG. 16 is a sectional view taken along the line XVI—XVI in FIG. 15.

A second speed change operation member 133 of a speed change operation member 6b according to the present embodiment includes a grip operation portion 132 generally continuous with the outer circumference of the first speed change operation member 14, and an inward wall 131 formed inward laterally of the grip operation portion 132. As shown in FIG. 16 the outer circumference of the grip operation portion 132 or inward wall 131 is formed with a pawl housing portion 134 bulging outward radially. The grip operation portion 132 or the inward wall 131 is formed with a press operation portion 135 bulging outward radially and continuous with the pawl housing 134.

Figure 15:
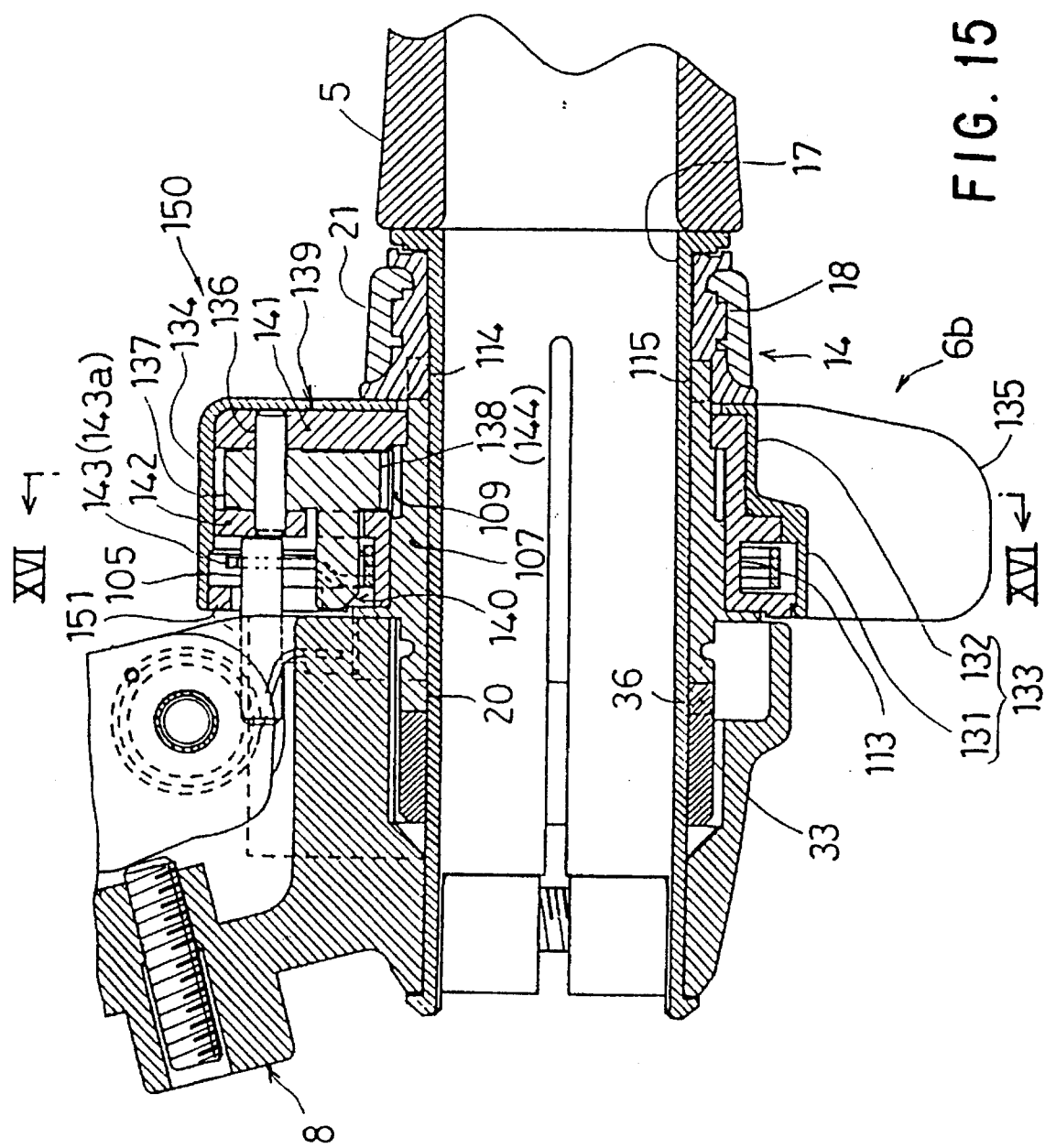
FIG. 15 is an enlarged view of a primary portion in FIG. 14.

As shown in FIGS. 15 and 16 a transmission mechanism 150 according to the present embodiment includes a pawl holding member 139, an engaging pawl 137, and a return spring 143.

As shown in FIG. 15 the pawl holding member 139 is rotatably fitted around the cable winding member 107. The pawl holding member 139 includes opposing walls 141, 142 bulging within the inner space of the pawl housing portion 134 of the second speed change operation member 133, and an inward wall 151 facing the outward side face of the base end portion of the brake bracket 8. The pawl holding member 139 is fixed to the second speed change operation member 133 so as to rotate integrally with the second speed change operation member 133.

As shown in FIG. 15 the opposing walls 141, 142 support a pin 136. The pin 136 pivotally supports the engaging pawl 137.

Figure 21:
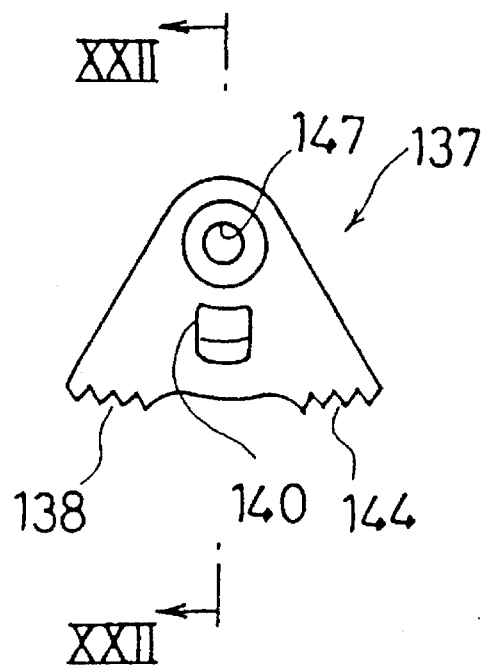
FIG. 21 is a side view of an engaging pawl according to the second embodiment.
Figure 22:
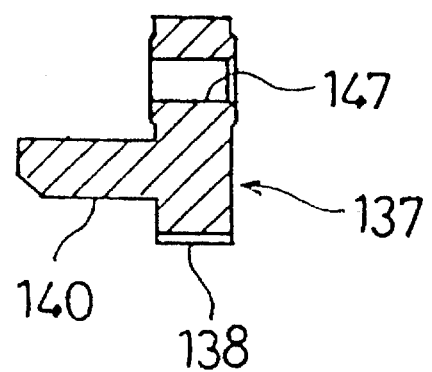
FIG. 22 is a sectional view taken along the line XXII—XXII in FIG. 21.

As shown in FIGS. 21 and 22 the engaging pawl 137 is substantially triangular. A vertex portion of the engaging pawl 137 is formed with an insertion hole 147 for receiving the pin 136. The side opposing the vertex is formed with a pair of engaging teeth 138, 144 at its end portions. The engaging pawl 137 is also integrally provided at its side center with a spring catcher portion 140 having a generally square cross section projecting in parallel to the pin inserted through the insertion hole 126.

On the other hand, the pawl holding member 139 has a circumferential wall portion sandwiched between the opposing walls 141 and 142. The circumferential wall portion is provided with an opening 128 for allowing the engaging pawl 137 to engage with the teeth portion 109 of the cable winding member 107.

The coil portion of the return spring 143 is fitted around the pawl holding member 139 between the inward wall 151 and the opposing wall 142. The two ends of the return spring 143 are respectively introduced around the sides of the spring catcher portion 140 and are engaged respectively with the sides of a spring catcher pin 105 projecting outwardly of the base end portion of the brake bracket 8. This return spring elastically urges the engaging pawl 137 or pawl holding member 139, providing it with elastic returning force to move back to a predetermined commencing point of rotation.

As shown in FIG. 16 the ends 143a, 143b of the return spring 143 are engaged with the spring catcher pin 105 while elastically pressing the two opposing square faces of the spring catcher portion 140. Thus, the pin 117, the spring catcher portion 140, and the handlebar axis radially align at free state. At this state the pair of engaging teeth 138, 144 are disengaged from the engaging teeth portion 109 of the cable winding member 107.

Now, function of the speed change operation assembly 6b according to second embodiment will be described referring to FIGS. 16 through 20.

Figure 19:
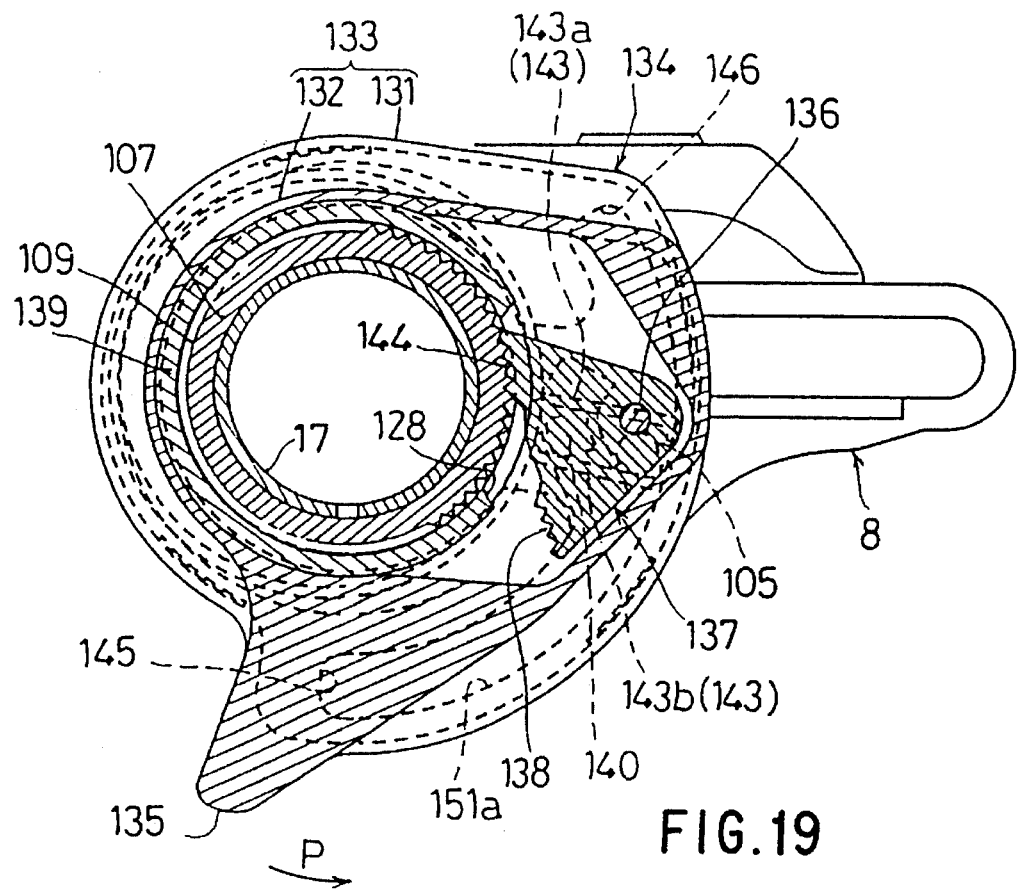

Starting from the state shown in FIG. 16, when the press operation portion 135 is moved counterclockwise (Arrow P,) a counterclockwise end 143a of the return spring 143 presses the spring catcher portion 140 counterclockwise as shown in FIG. 19. The engaging pawl 137 is now pivoted counterclockwise around the pin 136 bringing the engaging teeth 144 into engagement with the teeth portion 109 of the cable winding member 107.

When the press operation portion 135 is further moved counterclockwise (Arrow P,) the engaging teeth 144 remain engaged, whereas the second speed change operation member and the cable winding member 107 are integrally rotated in the cable winding direction to perform a speed change operation.

The inward wall 151 is provided with an arcuate hole 151a for receiving the pin 105. By contacting an end of the arcuate hole 151a, the pin 105 limits the range of rotation of the second speed change operation member.

Figure 20:
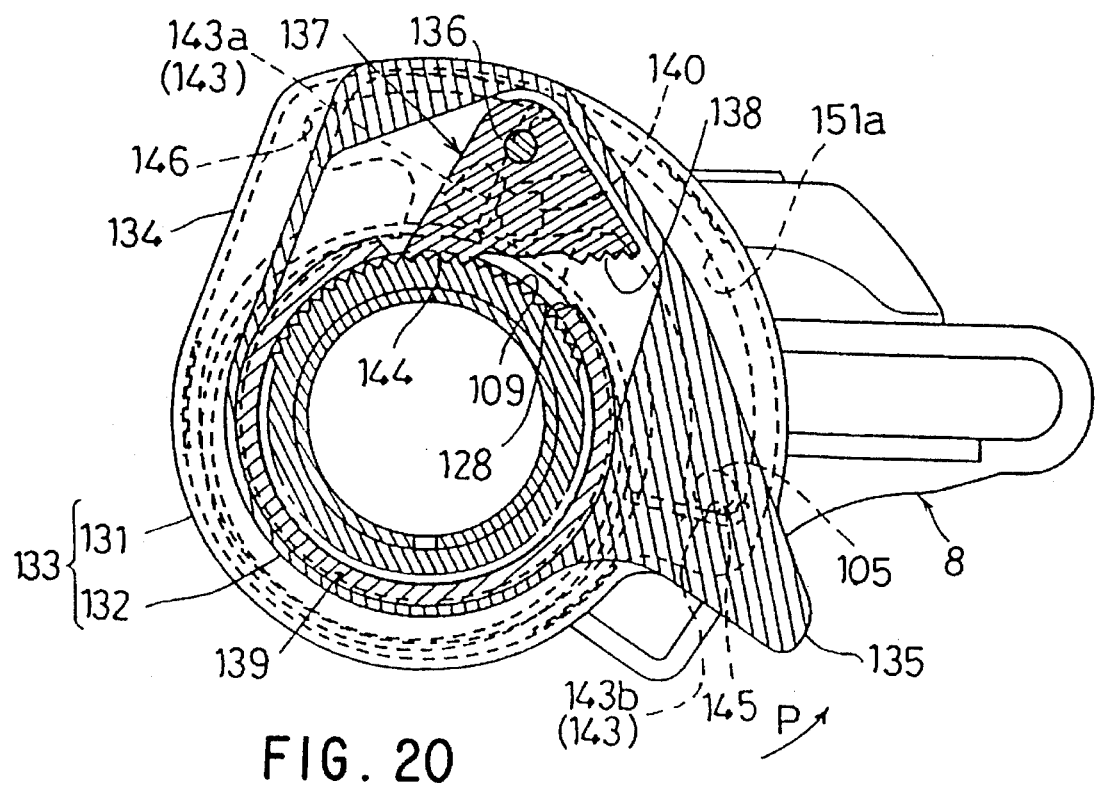

Now, when the operating force is removed in the state shown in FIG. 20, the engaging pawl 137 or pawl holding member 139 is automatically rotated in the direction in which the ends 143a, 143b of the return spring 143 move closer to each other, back into the neutral commencing point of rotation shown in FIG. 16.

When returning back to the neutral commencing point, the spring catcher portion 140 of the engaging pawl 137 is under a rotational momentum urging the engaging pawl 137 clockwise. Thus, as shown in FIG. 16 the teeth 138, 144 of the engaging pawl 137 are disengaged from the engaging teeth portion 109 at the neutral position.

Figure 17:
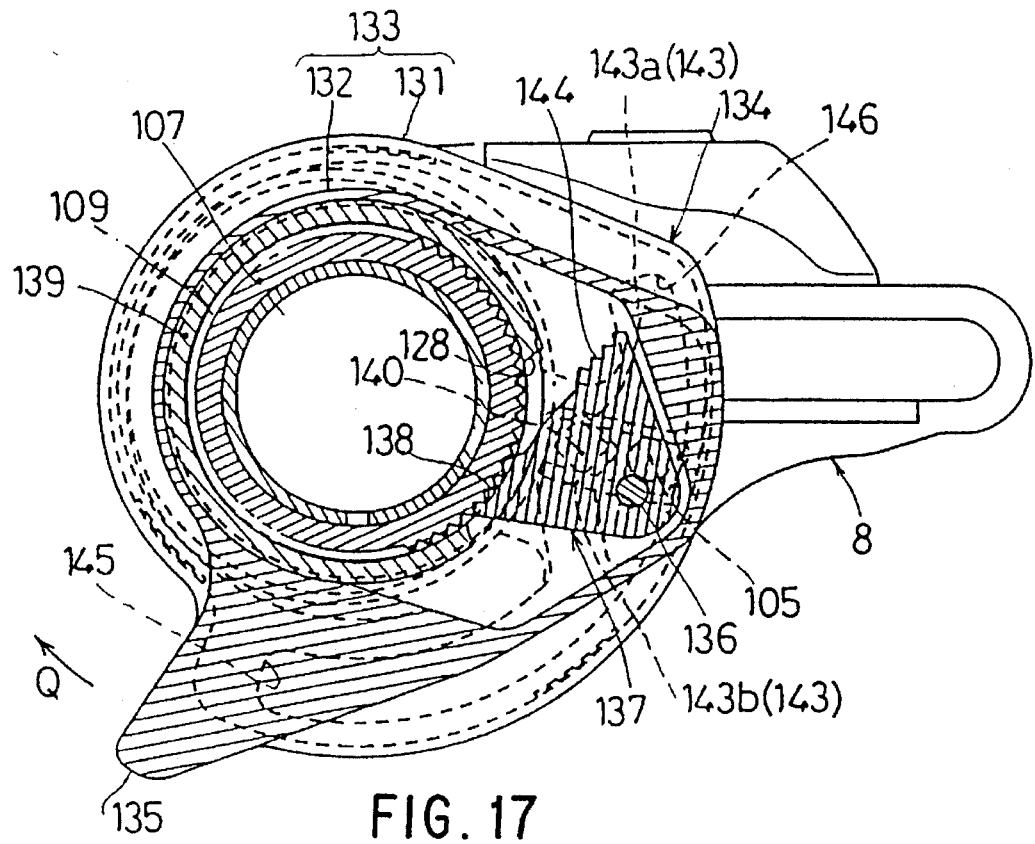
FIG. 17, 18, 19 and 20 are section views corresponding to FIG. 16 for depicting function of the second embodiment.

On the other hand, when the press operation portion 106 is moved clockwise (Arrow P) from the state shown in FIG. 16, the clockwise end 143b of the return spring 143 moves away from the spring catcher pin 105 as shown in FIG. 17 while pressing the spring catcher portion 140 of the engaging pawl 137 to move the engaging pawl 137 clockwise. This brings the teeth 138 of the engaging pawl 137 into engagement with the engaging teeth portion 109 of the cable winding member 107 as shown in FIG. 17.

Figure 18:
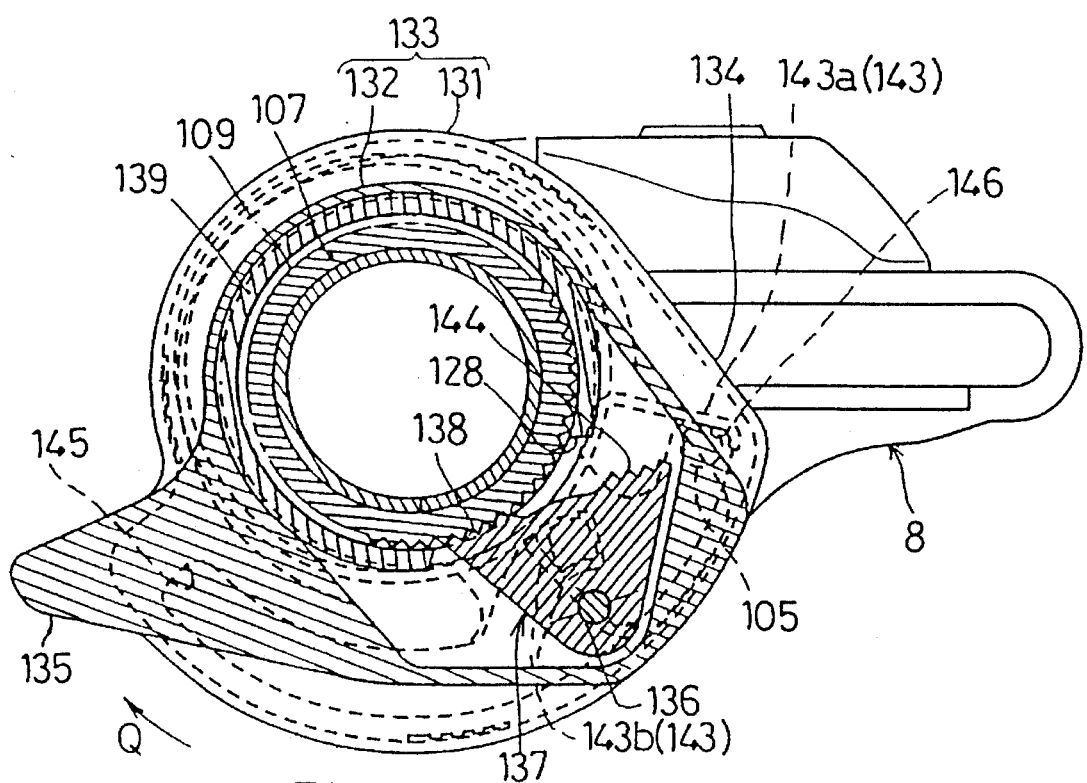

When the press operation portion 106 is further pressed clockwise from the state shown in FIG. 17, the second speed change operation member 133 or pawl holding member 139 is integrally rotated. Then, as shown in FIG. 18 the cable winding member 107 is rotated in the cable paying out direction until contacted by a circumferential end face 146.

When the pressing force applied on the press operation portion 135 is removed, the second speed change operation member 133 is returned to the neutral commencing point shown in FIG. 16 by the clockwise end 143b of the return spring 143. At the same time the engaging teeth 138, 144 of the engaging pawl 137 are disengaged from the engaging teeth portion 109.

In the speed change operation assembly of the above-described arrangement, it is possible to wind or pay out the speed control cable by moving the second speed change operation member 133 in one direction in a rotatively reciprocating manner.

Thus, it is possible to wind or pay out the speed control cable at a desired amount by rotatively reciprocating the speed change operation member 133 a plurality of times within the range limited by the spring catcher pin 105 and the circumferential end faces 145, 146 of the arcuate hole functioning as stopper faces.

Further, it becomes possible, as in the first embodiment, to pull a necessary amount of control cable for a speed change operation while the reciprocating movement per stroke of the second speed change operation member 133 can be small.

Therefore, when a greater amount of cable must be pulled for a speed change, there is no need to change the grip position on the speed change operation member, leading to a significant improvement in speed change operability, assured operability for quick braking, and substantially improved safety.

Further, in the present embodiment the press operation portion 135 can be operated by the thumb, for example. This makes possible to perform a speed change operation at the same time with a braking operation, enabling to perform the speed change operation in different ways in response to various running conditions.

FIGS. 23 through 28 show a third embodiment according to the present invention.

Again in this embodiment, the arrangement except for a second speed change operation member 103a and a transmission mechanism 152 use the same constitution as in the first and second embodiments, and therefore will not be described hereinbelow.

A speed change operation assembly 6c according to this embodiment uses an engaging pawl 110a. This engaging pawl corresponds the engaging pawl used in the first embodiment, but is arranged for operation directly with a rider's finger.

The second speed change operation member 103a is formed in a shape of a stepped cylinder comprising a grip operation portion 102a provided continuously with the circumference of the first speed change operation member 14, and an inward wall portion 101a located inward axially of the grip operation portion 102a bulging outward radially.

The second speed change operation member further includes a press operation portion 148 of the engaging pawl 110 projecting from the circumference of the grip operation portion 102a and the inward wall portion 101a.

A speed change operation is performed, while gripping the second speed change operation member 103a, by pressing the press operation portion 148 to rotate the second speed change operation member 103a integrally with the engaging pawl 110a about an axis of the handlebar.

The transmission mechanism 152 includes a pawl holding member 108, the engaging pawl 110a and a return spring 104.

Figure 23:
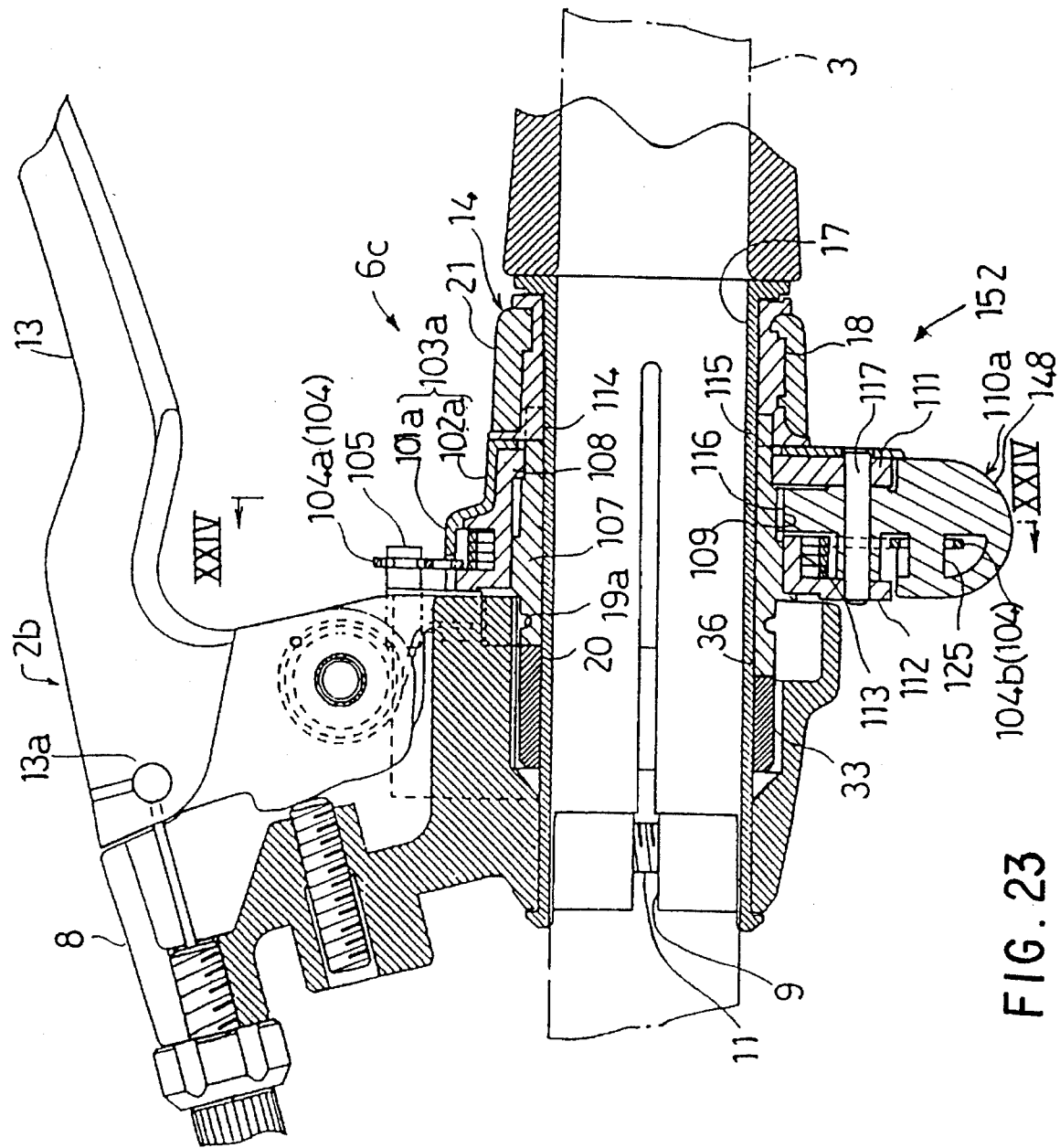
FIG. 23 is a sectional view according to a third embodiment showing a section along the line XXIII-$O_1$-O-$A_1$-$A_2$-XXIII in FIG. 24.
Figure 24:
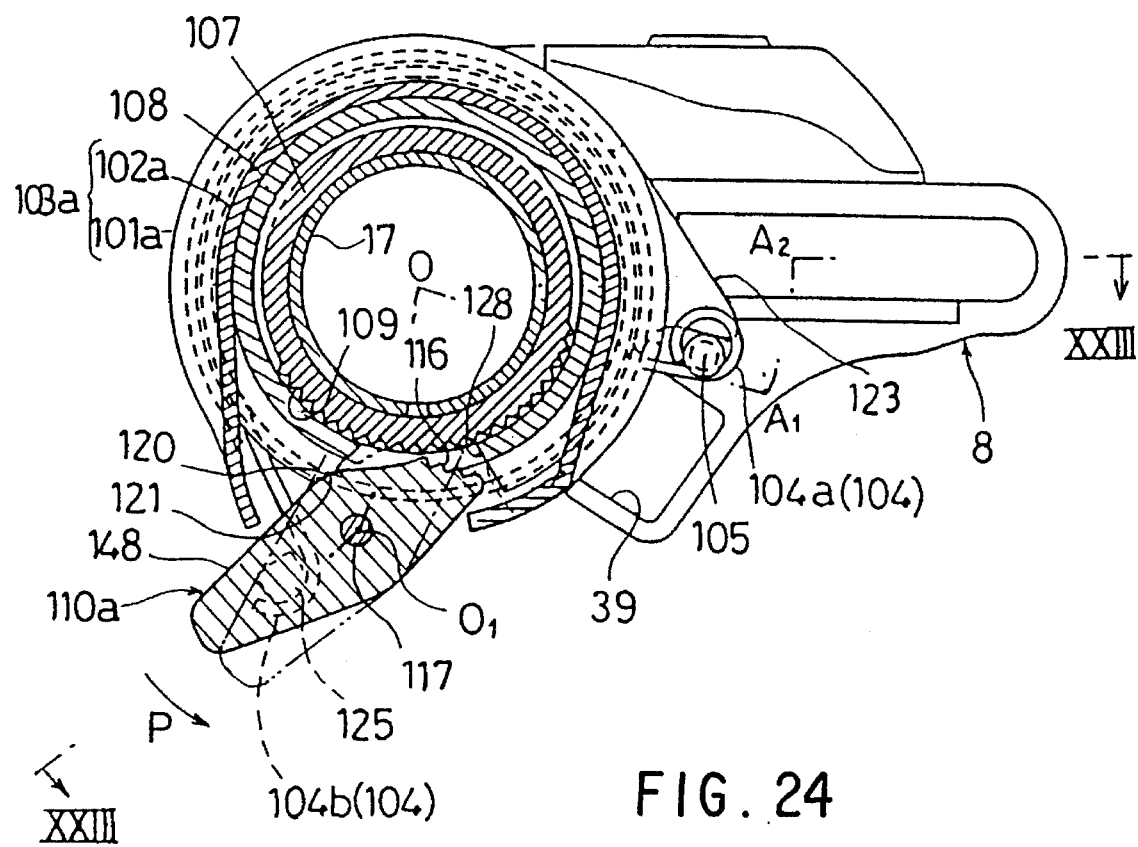
FIG. 24 is a sectional view taken along the line XXIV—XXIV in FIG. 23.
Figure 25:
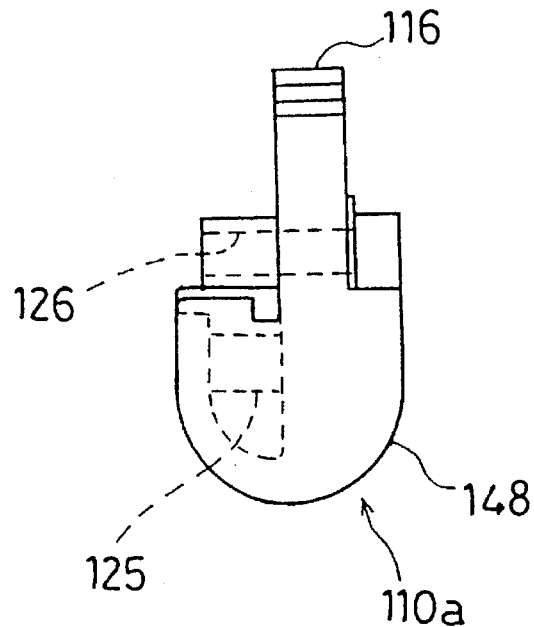
FIG. 25 is a front view of an engaging pawl according to the third embodiment.
Figure 26:
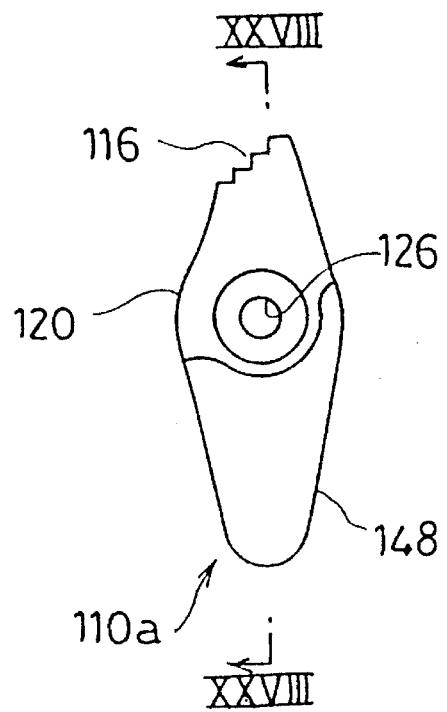
FIG. 26 is a left side view of the engaging pawl according to the third embodiment.
Figure 27:
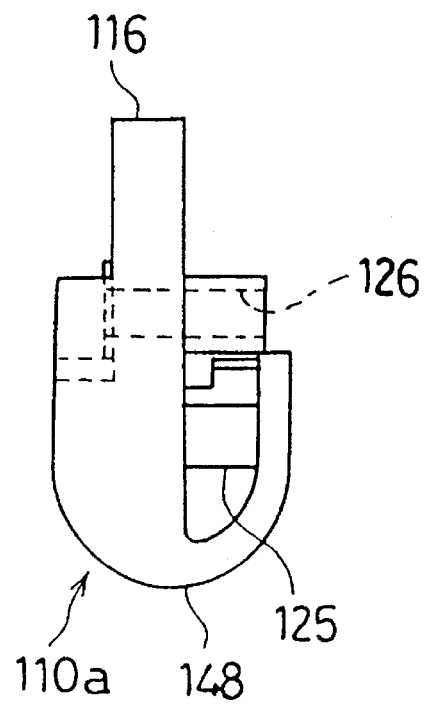
FIG. 27 is a rear view of the engaging pawl according to the third embodiment.
Figure 28:
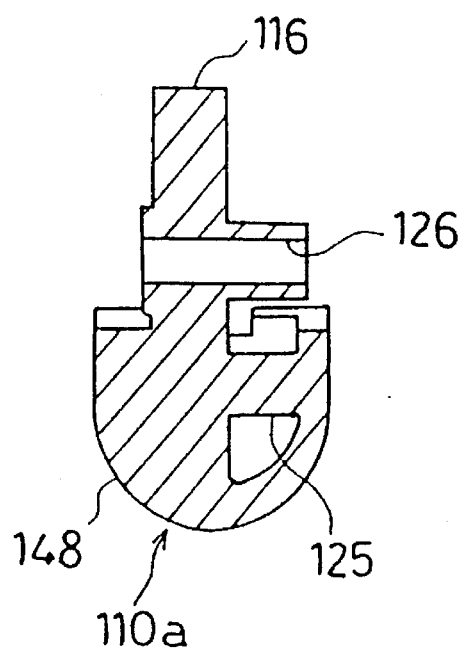
FIG. 28 is a sectional view taken along the line XXVIII—XXVIII in FIG. 26.

As shown in FIG. 23 the pawl holding member 108 is rotatably fitted around the cable winding member 107. The pawl holding member 108 is provided with opposing walls 111, 112 projecting outward radially. These opposing walls 111, 112 supports a pin 117 in s bridge-like manner. The pin pivotally supports the engaging pawl 110a. As shown in FIG. 24 a circumferential wall portion sandwiched by the opposing walls 111, 112 is formed with an opening 128. The opening 128 allows the pawl portion 116 of the engaging pawl 110a to engage with the engaging teeth portion 109 of the cable winding member 107.

As shown in FIGS. 25 through 28 the engaging pawl 110a includes the press operation portion 148 for press operation with a rider's finger, the pawl portion 116 to be engaged with the engaging teeth portion 109 of the cable winding member 107, and the spring catcher 125 for fixing an end portion of the return spring 104.

An insertion hole 126 through which the pin 117 is inserted is located more inward radially from the handlebar axis than the spring catcher 125. Thus, as shown in FIG. 24 the pawl portion 116 is held disengaged from the engaging teeth portion 109 by the return spring 104 at free state.

When a speed change operation is performed, the press operation portion 148 of the engaging portion 110a is pressed counterclockwise (Arrow P) in FIG. 24, moving the engaging pawl 110a around the pin 117 to engagement with the engaging teeth portion 109, and then, rotating the entire second speed change operation member integrally with the engaging pawl 110a.

This makes the second speed change operation member 103 and the cable winding member 107 rotate integrally with each other in the cable pulling direction to perform the speed change operation.

When the force applied to the press operation portion 148 is removed, the return spring 104 causes the engaging pawl 110a to move clockwise, as shogun in FIG. 24, from the state drawn in the phantom line to the state shown drawn in the solid line. This rotational movement disengages the pawl portion 116 from the engaging teeth portion 109. When the gripping force applied to the second speed change operation member 103a is removed, elastic force of the return spring 104 automatically moves the entire second speed change operation member 103a back into the predetermined commencing point of rotation where the stopper portion 123 contacts the spring catcher pin 105.

Therefore, again in this embodiment, it becomes possible as in the first embodiment, to wind the speed control cable by moving the engaging pawl 110a or the second speed change operation member 103a in one direction in a rotatively reciprocating manner. Therefore, it is possible to achieve the same advantages as in the first embodiment.

The scope of the present invention is not limited to the embodiments described hereinabove.

For example, the first and second speed change operation members provide part of the grip portion in the embodiments; however, it is also possible to use the first or second speed change operation member for constituting the entire grip portion of the handlebar.

Further, in the first embodiment, the second speed change operation member is to rotate the cable winding member 107 in the cable pulling direction; however, it is also possible to arrange for the cable winding member to be rotated in the cable paying out direction.

Still further, in the embodiment, the inner wire t1 is wound or paid out via the cable winding reel rotated by the drive cable K; however, an arrangement can also be made to make the drive reel portion 19 directly wind the speed control cable.

Still further, the click mechanism 32 is used for the retaining mechanism 15 in the embodiments; however, it is of course possible to use other mechanisms such as a friction mechanism and ratchet mechanism.

I claim:

1. A bicycle speed change operation assembly comprising:

a first speed change operation member and a second speed change operation member each supported around a grip end portion of the handlebar about an axis of a handlebar for rotation;

a cable winding member rotated in response to a rotating operation of the speed change operation members for winding or paying out a speed control cable; and a retaining mechanism for holding the cable winding member at a predetermined rotational position;

wherein the first speed change operation member is connected to the cable winding member for integral rotation therewith in a cable pulling direction and a cable paying out direction;

whereas the second speed change operation member is connected to the cable winding member by a transmission mechanism for rotating the cable winding member in the cable pulling direction or the cable paying out direction in response to rotational reciprocation of the second speed change operation member from a predetermined commencing point.

2. The bicycle speed change operation assembly according to claim 1, wherein at least one of the first and second speed change operation members is cylindrical and rotatably fitted around the grip end portion of the handlebar.

3. The bicycle speed change operation assembly according to claim 1, wherein the second speed change operation member is elastically urged by a spring to the commencing point for rotation in the cable pulling direction or cable paying out direction; and the transmission mechanism allows the second speed change operation member to rotate with the cable winding member when the second speed change operation member is rotated in the cable pulling or paying out direction from the commencing point but to cancel rotational coupling relation between the second speed change operation member and the cable winding member when the second speed change operation member rotates back toward the commencing point.

4. The bicycle speed change operation assembly according to claim 1, wherein the second speed change operation member is elastically urged by a spring to a neutral position which provides the commencing point for rotation in the cable winding direction and cable paying out direction; and the transmission mechanism allows the second speed change operation member to rotate with the cable winding member when the second speed change operation member in the cable winding or paying out direction from the neutral point but to cancel rotational coupling relation between the second speed change operation member and the cable winding member when the second speed change operation member rotates back toward the neutral position.

5. The bicycle speed change operation assembly according to claim 1, wherein the second speed change operation member is provided with a press operation portion projecting radially outward for operation with a rider's finger.

* * * * *